(12) United States Patent
Park et al.

(10) Patent No.: US 10,705,390 B2
(45) Date of Patent: Jul. 7, 2020

(54) COLOR CONVERSION SUBSTRATE AND LIQUID-CRYSTAL DISPLAY DEVICE INCLUDING THE SAME

(71) Applicant: Samsung Display Co. Ltd., Yongin-si (KR)

(72) Inventors: Kyung Hae Park, Seongnam-si (KR); Joon Hyung Park, Seoul (KR); Jong Ho Son, Seoul (KR); Chang Hun Lee, Hwaseong-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 0 days.

(21) Appl. No.: 16/001,762

(22) Filed: Jun. 6, 2018

(65) Prior Publication Data

US 2019/0163023 A1  May 30, 2019

(30) Foreign Application Priority Data

Nov. 27, 2017 (KR) .................. 10-2017-0159478

(51) Int. Cl.
*G02F 1/1343* (2006.01)
*G02F 1/1335* (2006.01)
(Continued)

(52) U.S. Cl.
CPC .. *G02F 1/134309* (2013.01); *G02F 1/133504* (2013.01); *G02F 1/133512* (2013.01); *G02F 1/133514* (2013.01); *G02F 1/133528* (2013.01); *G02F 1/133536* (2013.01); *G02F 1/133617* (2013.01); *G02F 1/1368* (2013.01);
(Continued)

(58) Field of Classification Search
CPC ......... G02F 1/134309; G02F 1/133504; G02F 1/133512; G02F 1/133528; G02F 1/133514; G02F 2001/133531; G02F 2001/133548; G02F 2201/121; G02F 2201/123; G02F 2001/136222; G02F 1/1368;
(Continued)

(56) References Cited

U.S. PATENT DOCUMENTS 5,299,289 A * 3/1994 Omae ............... G02F 1/133371
                                                    348/E9.027
8,926,157 B2 * 1/2015 Umeda ............. G02F 1/133504
                                                    362/606
(Continued)

FOREIGN PATENT DOCUMENTS

KR  1020040060526  7/2004
KR  1020150059494  6/2015
(Continued)

*Primary Examiner* — Hoan C Nguyen
(74) *Attorney, Agent, or Firm* — Cantor Colburn LLP

(57) ABSTRACT

A liquid-crystal display device includes a first polarizer which has a transmission axis extended in a first direction, a second polarizer disposed above the first polarizer and which has a transmission axis extended in a second direction intersecting the first direction, a liquid-crystal layer disposed between the first polarizer and the second polarizers, and a linear patterned layer disposed between the liquid-crystal layer and the second polarizer, wherein the linear patterned layer comprises a pattern of linear features and the linear features of the pattern are extended in the second direction and spaced apart from one another in the first direction.

19 Claims, 14 Drawing Sheets

(51) Int. Cl.
  *G02F 1/13357* (2006.01)
  *G02F 1/1337* (2006.01)
  *G02F 1/1362* (2006.01)
  *G02F 1/1368* (2006.01)

(52) U.S. Cl.
  CPC ............... *G02F 1/133723* (2013.01); *G02F 2001/133531* (2013.01); *G02F 2001/133548* (2013.01); *G02F 2001/133614* (2013.01); *G02F 2001/133746* (2013.01); *G02F 2001/136222* (2013.01); *G02F 2201/121* (2013.01); *G02F 2201/123* (2013.01)

(58) Field of Classification Search
  CPC ... G02F 2001/133614; G02F 1/133723; G02F 2001/133746
  See application file for complete search history.

(56) References Cited

U.S. PATENT DOCUMENTS

| | | | |
|---|---|---|---|
| 9,423,646 B2* | 8/2016 | Nam | G02F 1/133526 |
| 9,933,132 B2* | 4/2018 | Shin | B32B 27/00 |
| 2008/0218669 A1* | 9/2008 | Nishimura | G02F 1/133512 |
| | | | 349/110 |

FOREIGN PATENT DOCUMENTS

| | | |
|---|---|---|
| KR | 1020150095976 | 8/2015 |
| KR | 102001114326 | 5/2016 |
| KR | 1020160083794 | 7/2016 |
| KR | 1020160105276 | 9/2016 |

* cited by examiner

COLOR CONVERSION SUBSTRATE AND LIQUID-CRYSTAL DISPLAY DEVICE INCLUDING THE SAME

This application claims priority to Korean Patent Application No. 10-2017-0159478, filed on Nov. 27, 2017, and all the benefits accruing therefrom under 35 U.S.C. § 119, the content of which in its entirety is herein incorporated by reference.

BACKGROUND

1. Field of the Disclosure

The invention relates to a color conversion substrate and a liquid-crystal display device including the same.

2. Description of the Related Art

A display device become more and more important as multimedia technology evolves. Accordingly, a variety of display devices such as a liquid-crystal display device and an organic light-emitting diode display device are being developed For example, a liquid-crystal display device may control the polarization state of light passing through a liquid-crystal layer by aligning liquid crystals in the liquid-crystal layer using an electric field formed between pixel electrodes and a common electrode. The liquid-crystal layer may work as an optical shutter for adjusting the amount of light provided from a light source unit together with two polarizers disposed on and below it. By doing so, the amount of light passing through the liquid-crystal layer in each pixel is controlled, thereby displaying images.

As liquid-crystal display devices become lager, it is preferable to achieve better visibility from side angles.

SUMMARY

To improve visibility from side angles of liquid-crystal display devices, there has been proposed to use a pixel electrode having domain dividing means to form a plurality of domains in a pixel such that liquid crystals are aligned differently therein. While this approach improves the visibility from side angles, there are still limitations.

Features and advantages of the invention provide a liquid-crystal display device with further improved visibility from side angles.

Features and advantages of the invention also provide a color conversion substrate capable of improving visibility from side angles.

These and other Features and advantages, exemplary embodiments and advantages of the invention will become immediately apparent to those of ordinary skill in the art upon review of the Detailed Description and Claims to follow.

According to an exemplary embodiment of the invention, a liquid-crystal display device includes a first polarizer which has a transmission axis extended in a first direction, a second polarizer disposed above the first polarizer and which has a transmission axis extended in a second direction intersecting the first direction, a liquid-crystal layer disposed between the first polarizer and the second polarizers. and a linear patterned layer disposed between the liquid-crystal layer and the second polarizer, where the linear patterned layer includes a pattern of linear features and the linear features of the pattern are extended in the second direction and spaced apart from one another in the first direction.

In an exemplary embodiment, the liquid-crystal display device may further include a light source unit, where the light source unit and the second polarizer may be spaced apart from each other with the first polarizer interposed therebetween.

In an exemplary embodiment, the liquid-crystal display device may further include a color conversion pattern which converts a color of light incident from the light source, where the linear patterned layer and the light source unit may be spaced apart from each other with the color conversion pattern interposed therebetween.

In an exemplary embodiment, the liquid-crystal display device may further include a first pixel representing a first color, and a second pixel representing a second color having a peak wavelength longer than that of the first color, where the second pixel may be located on a side of the first pixel in the first direction.

In an exemplary embodiment, the liquid-crystal display device may further include a light-blocking element disposed at a boundary between the first pixel and the second pixel, where the linear patterned layer and the liquid-crystal layer may be spaced apart from each other with the light-blocking element interposed therebetween, and where the light-blocking element may at least partially overlap with the pattern of linear features in a plan view.

In an exemplary embodiment, the liquid-crystal display device may have a pair of longer sides and a pair of shorter sides, and where the longer sides may be extended in the first direction, while the shorter side may be extended in the second direction.

In an exemplary embodiment, light provided from the light source unit and incident on the linear patterned layer may be at least partially diffused in the first direction.

In an exemplary embodiment, a width of each of the linear features of the pattern may decrease from the second polarizer toward the liquid-crystal layer.

In an exemplary embodiment, a ratio of a spacing distance between adjacent linear features of the pattern to a maximum width of each of the linear features may range from about 0.5 to about 2.0.

In an exemplary embodiment, a ratio of a height of each of the linear features to the maximum width of each of the linear features may range from about 0.5 to about 1.5.

In an exemplary embodiment, an inclination angle defined by a side surface of each of the linear features with respect to an upper surface of the linear feature may be 45 degrees or more.

In an exemplary embodiment, a ratio of a maximum width of each of the linear features to a cell gap of the liquid-crystal layer may range from about 0.5 to about 2.0, and where the liquid-crystal layer may include vertically aligned liquid crystals in its initial orientation.

In an exemplary embodiment, the maximum width of each of the linear features may be larger than the cell gap of the liquid-crystal layer.

In an exemplary embodiment, the liquid-crystal display device may further include a pixel electrode disposed between the first polarizer and the liquid-crystal layer, and a common electrode disposed between the second polarizer and the liquid-crystal layer, where the linear patterned layer may further include an overcoating layer disposed between the pattern of linear features and the common electrode and in contact with the pattern of linear features, and where a difference between a refractive index of the pattern of linear features and a refractive index of the overcoating layer may be equal to or greater than 0.15 and less than about 0.5.

In an exemplary embodiment, the second polarizer may include a wire grid pattern layer including a pattern of wires and the wires of the pattern are extended in the first direction and spaced apart from one another in the second direction, and where a spacing distance between adjacent linear features of the pattern of linear features may be larger than a spacing distance between adjacent wires of the pattern of wires in the second direction.

In an exemplary embodiment, the liquid-crystal display device may further include a light source unit, and a color conversion pattern which converts a color of light incident from the light source unit, where the light source unit and the second polarizer may be spaced apart from each other with the first polarizer interposed therebetween, and where the second polarizer and the linear patterned layer may be spaced apart from each other with the color conversion pattern interposed therebetween.

In an exemplary embodiment, the liquid-crystal display device may further include a first pixel which represents a first color, and a second pixel which represents a second color having a peak wavelength longer than that of the first color, where the pattern of linear features may include a first pattern of linear features disposed in the first pixel, and a second pattern of linear features disposed in the second pixel, and where a size of the linear feature of the second pattern may be greater than a size of the linear feature of the first pattern.

In an exemplary embodiment, the liquid-crystal display device may further include a first pixel and a third pixel arranged in the first direction, where the pattern of linear features may include a first pattern of linear features located in the first pixel, each of the features including a first side surface and a second side surface arranged in the first direction in this order, and a second pattern of linear features located in the third pixel, each of the features including a third side surface and a fourth side surface arranged in the first direction in this order, and where an inclination angle of the first side surface may be substantially equal to an inclination angle of the fourth side surface, and an inclination angle of the second side surface may be substantially equal to an inclination angle of the third side surface.

In an exemplary embodiment, the liquid-crystal display device may further include a first pixel and a fourth pixel arranged in the first direction, the first pixel being located more to an edge of the liquid-crystal display device than the fourth pixel, where the pattern of linear features may include a first pattern of linear features located in the first pixel, each of the features including a first side surface and a second side surface arranged in the first direction in this order, and a second pattern of linear features located in the fourth pixel, each of the features including a third side surface and a fourth side surface arranged in the first direction in this order, and where an inclination angle of the first side surface may be smaller than an inclination angle of the third side surface, and an inclination angle of the second side surface may be substantially larger than an inclination angle of the fourth side surface.

According to an exemplary embodiment of the invention, a color conversion substrate includes a base, a pattern of linear features disposed on the base, where the linear features are spaced apart from one another in a first direction and extended in a second direction intersecting the first direction, an organic layer disposed directly on the pattern of linear features, and a light-blocking element disposed on the organic layer and in a form of a grid in a plan view.

According to an exemplary embodiment of the invention, at least a part of transmitted light is diffused by using a linear patterned layer including a pattern of linear features, thereby improving visibility from side angles of a liquid-crystal display device.

In addition, although the linear patterned layer having the light-diffusion function is disposed between the liquid-crystal layer and the polarizer, it does not depolarize the polarized, transmitted light, so that the structure of the display panel can be simpler, and the reliability can be improved.

It should be noted that effects of the invention are not limited to those described above and other effects of the invention will be apparent to those skilled in the art from the following descriptions.

BRIEF DESCRIPTION OF THE DRAWINGS

The above and other aspects and features of the invention will become more apparent by describing in detail exemplary embodiments thereof with reference to the attached drawings, in which.

DETAILED DESCRIPTION

Figure 1:
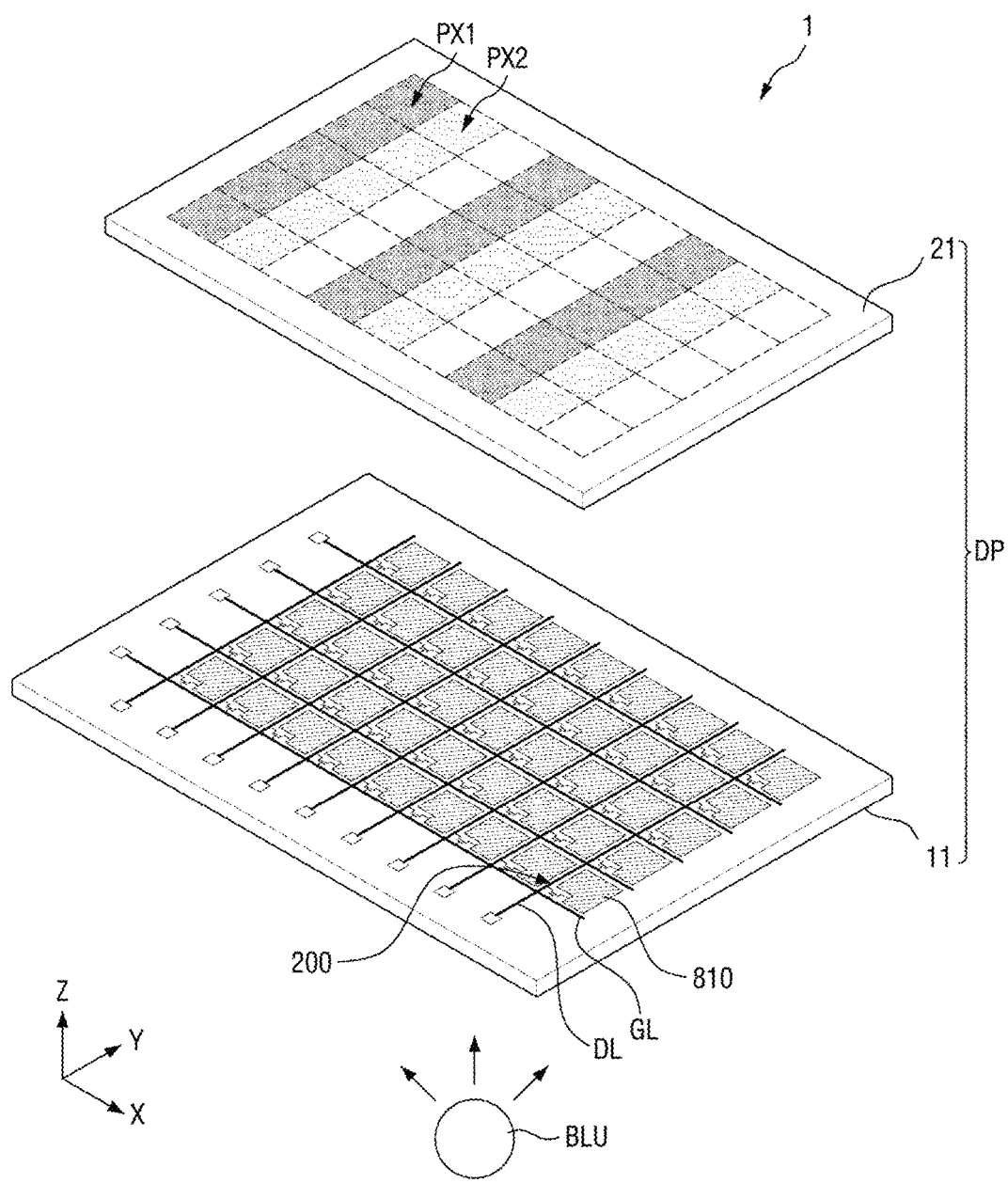
FIG. 1 is an exploded, perspective view of a liquid-crystal display device according to an exemplary embodiment of the invention.

Features of the invention and methods of accomplishing the same may be understood more readily by reference to the following detailed description of preferred embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other.

Like numbers refer to like elements throughout. As used herein, the term "and/or" includes any and all combinations of one or more of the associated listed items. "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms "a," "an" and "the" are intended to include the plural forms as well, including "at least one," unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof "At least one" is not to be construed as limiting "a" or "an." "Or" means "and/or." As used herein, the term "and/or" includes any and all combinations of one or more of the associated listed items.

As used herein, a first direction X refers to a direction in a plane, a second direction Y refers to a direction intersecting the first direction X in the plane, and a third direction Z refers to a direction perpendicular to the plane. In this specification, a direction may mean to includes both opposite directions parallel to the direction. That is, for example, the third direction Z may mean to include both a direction from a bottom to a top and a direction from the top to the bottom.

Hereinafter, exemplary embodiments of the invention will be described with reference to the accompanying drawings.

FIG. 1 is an exploded, perspective view of an exemplary embodiment of a liquid-crystal display device according to the invention.

Referring to FIG. 1, a display device 1 according to an exemplary embodiment of the invention may include a display panel DP, and a light source unit BLU providing light to the display panel DP.

The liquid-crystal display device 1 and the display panel DP may have a substantially rectangular shape having a pair of longer sides and a pair of shorter sides when viewed from the top (i.e., plan view). In some exemplary embodiments, the corners of the display panel DP may be chamfered or rounded. The longer sides may be extended in a direction substantially parallel to a first direction X, and the shorter sides may be extended in a direction substantially parallel to a second direction Y. As used herein, the "plane" refers to the xy-plane defined by two lines extended in the first direction X and the second direction Y, respectively.

A plurality of pixels PX1 and PX2 arranged approximately in a matrix may be defined in the display panel DP. As used herein, a "pixel" refers to a single area defined by dividing a display area into sub-areas for color reproduction in a plan view. A single pixel may represent a predetermined one of primary colors. That is, a single pixel may be a minimum unit that can represent a color independently of another pixel.

The plurality of pixels PX1 and PX2 may include first pixels PX1 for representing a first color, and second pixels PX2 for representing a second color having a peak wavelength thereof longer than that of the first color. In an exemplary embodiment, one first pixel PX1 and one second pixel PX2 are configured as at least a part of a repeated unit, so that such repeated units may be arranged in the first direction X. That is, the second pixels PX2 may be located on a side of the respective first pixels PX1 in the first direction X, respectively. The first pixels PX1 may be repeatedly arranged in the second direction Y, and the second pixels PX2 may be repeatedly arranged in the second direction Y. In the following description, the first color represented by the first pixels PX1 may be blue color having a peak wavelength in the range of approximately 430 to 470 nanometers (nm), and the second color represented by the second pixels PX2 may be green color having a peak wavelength in the range of approximately 530 to 570 nm. It is, however, to be understood that this is merely illustrative. In another exemplary embodiment, the second color may be red color having a peak wavelength in the range of approximately 610 to 650 nm.

The light source unit BLU may be disposed below the display panel DP to emit light having a certain wavelength toward the display panel DP. In an exemplary embodiment, the light source unit BLU may be an edge-lit light source unit that includes a light source (not shown) emitting light and a light-guide plate (not shown) guiding the light provided from the light source toward the display panel DP. The material of the light-guide plate is not particularly limited as long as it has high light transmittance. In an exemplary embodiment, for example, the light-guide plate may include a glass material, a quartz material, or a plastic material such as polyethylene terephthalate, polycarbonate. In another exemplary embodiment, the light source unit BLU may be a direct-lit light source unit that includes a plurality of light sources arranged to overlap with the display panel DP in a third direction Z.

The light source may be a light-emitting diode ("LED"), an organic light-emitting diode ("OLED"), a laser diode ("LD"), or the like. In an exemplary embodiment, the light source may emit white light that includes all of the blue wavelength band, the green wavelength band and the red wavelength band or may emit blue light that has a single peak wavelength in the range of approximately 430 to 470 nm.

Although not shown in the drawings, one or more optical sheets (not shown) may be disposed between the display panel DP and the light source unit BLU. The optical sheets may include one or more of a prism sheet, a diffusion sheet, a (reflective) polarizing sheet, a lenticular lens sheet, and a micro lens sheet. The optical sheet can improve the display quality of the liquid-crystal display device 1 by modulating optical characteristics (e.g., condensation, diffusion, scattering, or polarization characteristics) of the light provided from the light source unit BLU and traveling toward the display panel DP.

Hereinafter, the display panel DP will be described in detail with reference to FIG. 2.

Figure 2:
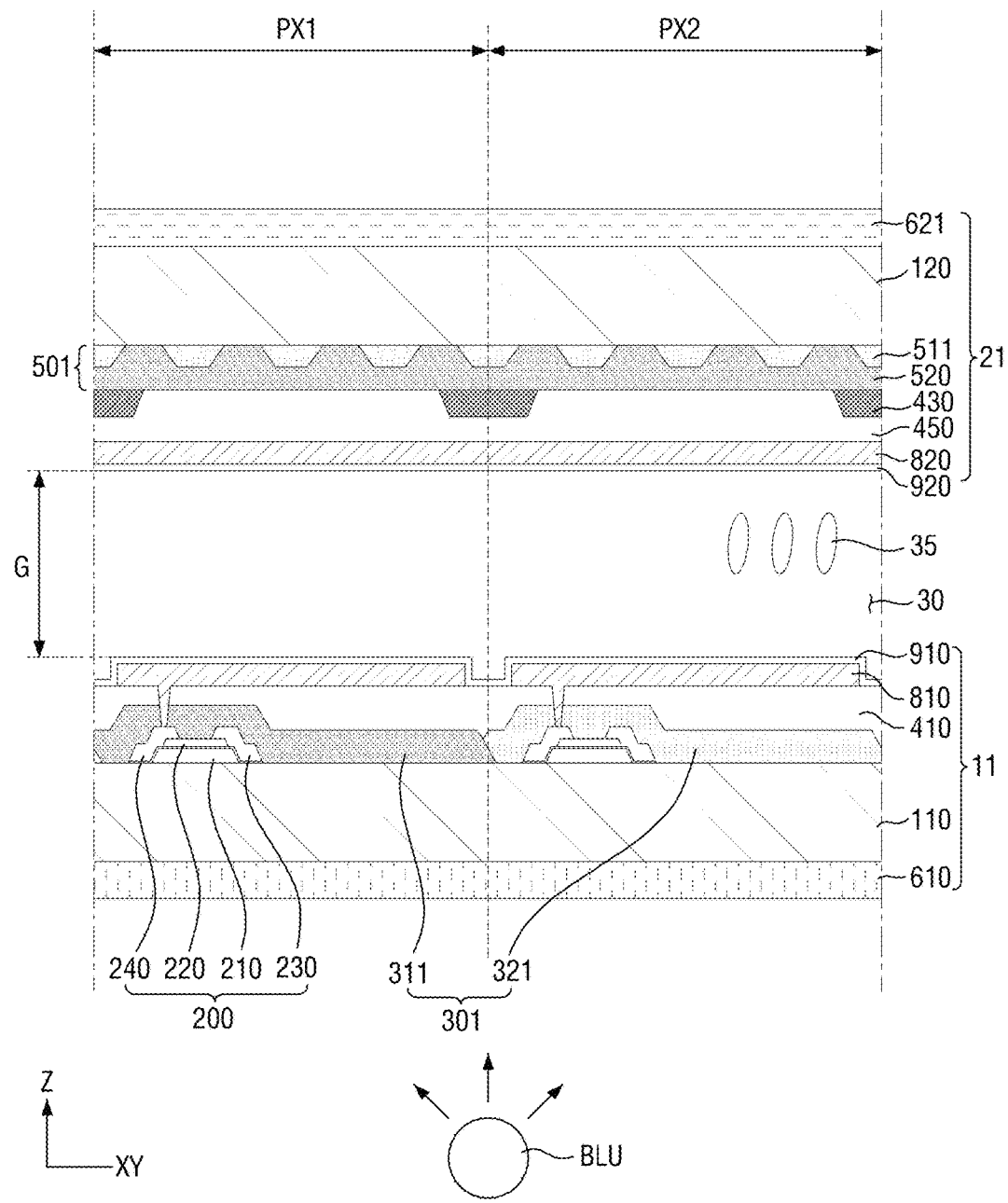
FIG. 2 is a cross-sectional view of pixels of the liquid-crystal display device shown in FIG. 1.
Figure 3:
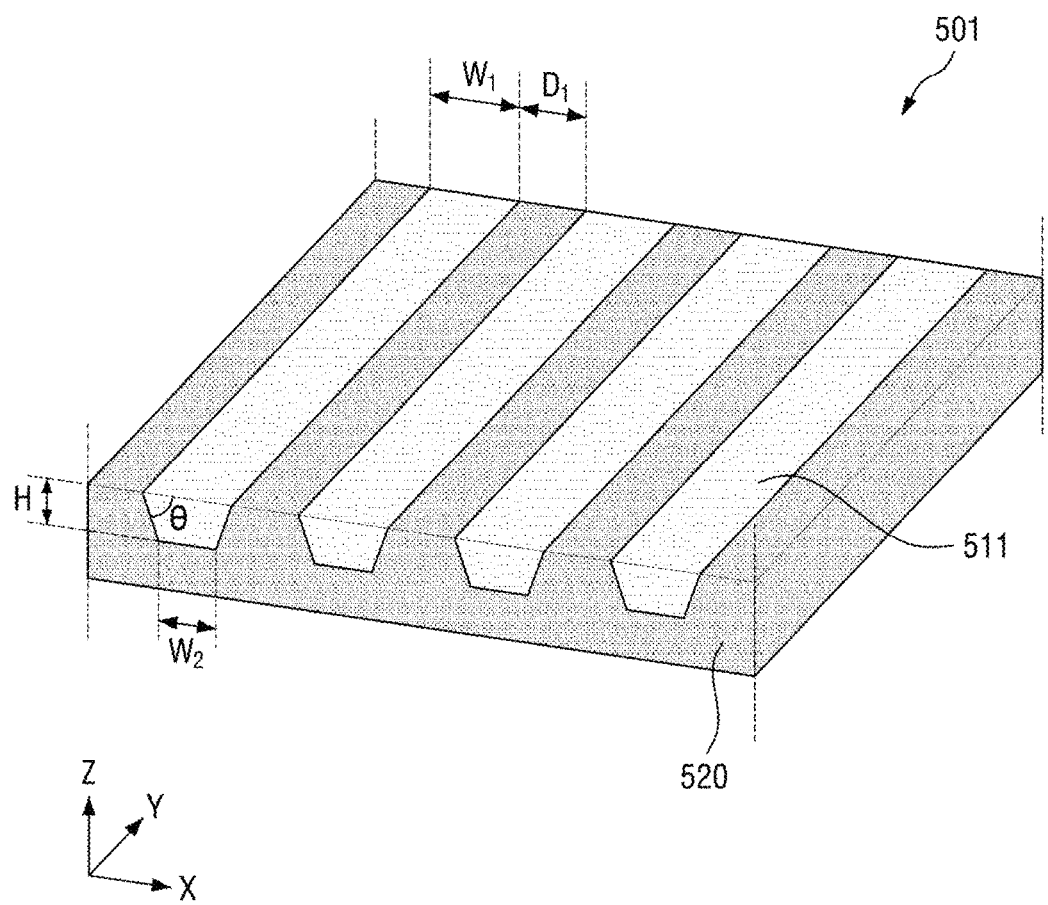
FIG. 3 is a perspective view of an exemplary embodiment of a linear patterned layer of FIG. 2.

FIG. 2 is a cross-sectional view of the pixels of the liquid-crystal display device of FIG. 1, showing a first pixel PX1 and a second pixel PX2 located on a side of the first pixel PX1 in the first direction X. FIG. 3 is a perspective view of an exemplary embodiment of a linear patterned layer of FIG. 2.

Referring to FIGS. 1 to 3, the display panel DP may include a bottom substrate 11 and a top substrate 21 facing each other, and a liquid-crystal layer 30 interposed therebetween. The liquid-crystal layer 30 may be sealed by the bottom substrate 11, the top substrate 21 and a sealing element (not shown) for attaching them together. The light provided from the light source unit BLU may transmit through the bottom substrate 11, the liquid-crystal layer 30 and the top substrate 21 in this order to contribute to displaying images by the display device 1.

The bottom substrate 11 will be described first. The bottom substrate 11 may include a first base 110, a switching element 200, pixel electrodes 810 and a lower polarizer 610, and may further include a color conversion pattern layer 301.

The first base 110 may be a transparent insulating substrate or a transparent insulating film. In an exemplary embodiment, for example, the first base 110 may include a glass material, a quartz material, or a transparent plastic material. In some exemplary embodiment of the invention, the first base 110 may be flexible such that the liquid-crystal display device 1 may be a curved display device.

A plurality of switching elements 200 may be disposed on a main surface (shown as the upper surface in FIG. 2) of the first base 110. Each of the pixels PX1 and PX2 may include the switching element 200, and the switching element 200 may transmit or block a driving signal to the pixel electrode 810, which will be described later. In an exemplary embodiment, the switching element 200 may be a thin-film transistor that includes a gate 210, an active layer 220 disposed on the gate 210, and a source 230 and a drain 240 spaced apart from each other on the active layer 220. A control terminal (e.g., the gate 210) of the switching element 200 may be electrically connected to a gate line GL to receive a gate driving signal. An input terminal (e.g., the source 230) of the switching element 200 may be electrically connected to a data line DL to receive a data driving signal. An output terminal (e.g., the drain 240) of the switching element 200 may be electrically connected to the pixel electrode 810. In an exemplary embodiment, the active layer 220 may include a silicon-based semiconductor material such as amorphous silicon, polycrystalline silicon and monocrystalline silicon, or may include an oxide semiconductor material or the like. The active layer 220 may work as a channel of the switching element 200 and may turn the channel on or off according to a voltage applied to the gate 210.

The color conversion pattern layer 301 may be disposed on the switching element 200. The color conversion pattern layer 301 may include a first color conversion pattern 311 disposed in the first pixel PX1, and a second color conversion pattern 321 disposed in the second pixel PX2. The first color conversion pattern 311 and the second color conversion pattern 321 may convert the color of incident light, e.g., the light provided from the light source unit BLU toward the display panel DP and incident thereon, such that the color of the exiting light is different from the color of the incident light. In an exemplary embodiment, for example, the light after passing through the first color conversion pattern 311 or the second color conversion pattern 321 may be converted into the light of a predetermined wavelength band.

In an exemplary embodiment, the first color conversion pattern 311 and the second color conversion pattern 321 may be wavelength-selective optical filters that block the light of a particular wavelength band while transmitting the light of other wavelength bands to thereby selectively transmit light in some wavelength bands.

The first color conversion pattern 311 may receive the light provided from the light source unit BLU and may transmit light of the blue wavelength band having a peak wavelength of blue light while blocking light of green and/or red wavelength bands having a peak wavelength longer than that of blue light. For example, the first color conversion pattern 311 may be a color filter that selectively absorbs green and/or red wavelength bands. In an exemplary embodiment, the color filter may include a base resin, and a colorant such as pigment or dye dissolved or dispersed in the base resin.

In addition, the second color conversion pattern 321 may receive the light provided from the light source unit BLU and may transmit light of the green wavelength band having a peak wavelength of green while blocking light of the blue wavelength band having a peak wavelength shorter than that of the green light and/or light in the red wavelength band having a peak wavelength longer than that of the green light. For example, the second color conversion pattern 321 may be a color filter that selectively absorbs blue and/or red-light wavelength bands.

In a light path from the light source unit BLU to a viewer (not shown), the first color conversion pattern 311 for converting transmitted light into blue light is disposed in the first pixel PX1 for representing blue color, and the second color conversion pattern 321 for converting the transmitted light into green light is disposed in the second pixel PX2. Thus, the pixels PX1 and PX2 can represent different colors, and the liquid-crystal display device 1 can realize color display.

An intermediate layer 410 may be disposed on the color conversion pattern layer 301. The intermediate layer 410 is disposed across the pixels PX1 and PX2 to isolate elements thereon from elements thereunder and/or to reduce level differences occurred by the switching element 200, electrodes (not shown) and wirings including the gate line GL the data line DL. The intermediate layer 410 may include one or more layers. In an exemplary embodiment, for example, the intermediate layer 410 may include an organic layer made of an organic material, an inorganic layer made of an inorganic material or a stack of an organic layer and an inorganic layer.

The plurality of pixel electrodes 810 may be disposed on the intermediate layer 410. The pixel electrodes 810 may be an electric field generating electrode that forms an electric field in the liquid-crystal layer 30 together with the common electrode 820 to be described later. The pixel electrodes 810 disposed in the pixels PX1 and PX2, respectively, may be controlled independently and may receive different driving signals. For example, each of the pixel electrodes 810 may be electrically connected to the output terminal of the switching element 200 through a contact hole defined by the intermediate layer 410 and by the color conversion pattern layer 301. The electric field formed by the pixel electrodes 810 and the common electrode 820 may control the behavior of the liquid crystals 35 disposed in the pixel and may align the liquid crystals 35. The pixel electrodes 810 may be made of a transparent conductive material. Examples of the transparent conductive material may include indium tin oxide ("ITO"), indium zinc oxide ("IZO"), zinc oxide (ZnO), indium (III) oxide ($In_2O_3$), indium gallium oxide ("IGO"), or aluminum zinc oxide ("AZO"). Although not shown in the drawings, the pixel electrode 810 may have domain dividing means, e.g., fine slits in a plan view.

In some exemplary embodiments of the invention, a first alignment layer 910 may be disposed on the pixel electrodes 810. The first alignment layer 910 may induce an initial orientation of the liquid crystals 35 in the liquid-crystal layer 30. As used herein, the term "initial orientation of liquid crystals" refers to the orientation of the liquid crystals when no electric field is formed across the liquid-crystal layer. For example, the first alignment layer 910 may be a vertical alignment layer that has an imide group in a repeating unit of the main chain and has a vertical aligner introduced as a side chain.

The lower polarizer 610 may transmit components of the polarized light oscillating in a direction parallel to its transmission axis and partially block components of the polarized light oscillating in a direction intersecting the transmission axis, thereby converting unpolarized incident light into light in a particular polarization state. That is, the lower polarizer 610 may have a polarizing function. The lower polarizer 610 may be an absorptive polarizer that absorbs components of the polarized light that oscillates in a direction intersecting its transmission axis, or a reflective polarizer that reflects components of the polarized light that oscillates in a direction intersecting its transmission axis.

The lower polarizer 610 may be disposed between the light source unit BLU and the liquid-crystal layer 30. In an exemplary embodiment, the lower polarizer 610 may be disposed on a main surface of the first base 110 (shown as the lower surface in FIG. 2). The lower polarizer 610 may be disposed directly on the surface of the first base 110, may be coupled with the first base 110 via an adhesive layer (not shown), or may be spaced apart from the first base 110. The transmission axis of the lower polarizer 610 may be substantially parallel to the first direction X. In an exemplary embodiment, for example, the lower polarizer 610 may transmit components of the polarized light parallel to the longer axis of the display panel DP and may block components of the polarized light parallel to the shorter axis of the display panel DP.

FIG. 2 illustrates an example where the lower polarizer 610 is disposed on the lower surface of the first base 110. It is, however, to be understood that this is merely illustrative. In other exemplary embodiments, the lower polarizer 610 may be disposed at any position between the light source unit BLU and the liquid-crystal layer 30 (e.g., between the first base 110 and the switching element 200, between the switching element 200 and the color conversion pattern layer 301, or between the color conversion pattern layer 301 and the intermediate layer 410).

Next, the liquid-crystal layer 30 will be described. The liquid-crystal layer 30 may include liquid crystals 35 that are initially orientated. As used herein, "liquid crystal" refers to molecules having liquid-crystal characteristics or a collection of such molecules. In an exemplary embodiment, the liquid crystals 35 have negative dielectric anisotropy, and their long axis may be aligned substantially perpendicular to the xy-plane in the initial orientation state. In some exemplary embodiments, the liquid crystals 35 may have a predetermined pre-tilt in their initial orientation. In this case, the angle defined by the major axis of the liquid crystals 35 with respect to the xy-plane may be approximately 80 degrees or more, or approximately 85 degrees or more. The initial orientation of the liquid crystals 35 may be induced by the first alignment layer 910 and the second alignment layer 920 described later.

The liquid-crystal layer 30 may be disposed between the lower polarizer 610 and an upper polarizer 621 to be described later. When an electric field is formed between the pixel electrodes 810 and the common electrode 820, the liquid crystals 35 may be tilted in a certain direction to change the polarization state of the light passing through the liquid-crystal layer 30 generally in the third direction Z. The liquid-crystal layer 30 may perform an optical shutter function for adjusting the amount of light that is provided from the light source unit BLU and passes through the liquid-crystal layer 30, together with the lower polarizer 610 and the upper polarizer 621.

In some exemplary embodiment of the invention, a cell gap G of the liquid-crystal layer 30 may be approximately 2.5 to 3.5 micrometers (μm), or approximately 2.9 to 3.3 μm. The cell gap G of the liquid-crystal layer 30 may be defined as the thickness of the liquid-crystal layer 30 in a region where effective light transmission occurs. In an exemplary embodiment where the liquid-crystal layer 30 includes substantially vertically orientated liquid crystals 35, when the cell gap G of the liquid-crystal layer 30 is within the above range, aligned liquid crystals 35 can exhibit optical anisotropic characteristics, e.g., good polarization state control characteristics, and high light transmittance.

Next, the top substrate 21 will be described. The top substrate 21 may include a second base 120, a common electrode 820 and the upper polarizer 621 and may further include a linear patterned layer 501.

The second base 120 may be a transparent substrate or a transparent film. In an exemplary embodiment, for example, the second base 120 may be made of a glass material, a quartz material or a transparent plastic material, like the first base 110. In some exemplary embodiments of the invention, the second base 120 may be flexible such that the liquid-crystal display device 1 may be a curved display device.

The linear patterned layer 501 may be disposed on a main surface (shown as the lower surface in FIG. 2) of the second base 120. The linear patterned layer 501 may be disposed between the lower polarizer 610 and the upper polarizer 621 to be described later, specifically between the liquid-crystal layer 30 and the upper polarizer 621.

The linear patterned layer 501 may include a pattern of linear features 511 and may further include a first overcoating layer 520 disposed on the pattern of linear features 511. The first overcoating layer 520 may be disposed directly on the pattern of linear features 511 to form an optical interface between the pattern of linear features 511 and the first overcoating layer 520.

Each of the pattern of linear features 511 and the first overcoating layer 520 may be made of a transparent organic or inorganic material having a predetermined refractive index. In an exemplary embodiment, for example, the pattern of linear features 511 may include an organic material such as a porous siloxane resin, a porous silsesquioxane resin, an acrylic resin, an ethylene resin, a carbonate resin and a styrene resin, a non-metallic inorganic material such as a porous silicon, a silicon oxide and silicon nitride, or a metallic material such as magnesia (MgO) and ITO. The first overcoating layer 520 may be an organic layer including an organic material such as a porous siloxane resin, a porous silsesquioxane resin, an acrylic resin, an ethylene resin, a carbonate resin or a styrene resin. The difference between the refractive index of the pattern of linear features 511 and the refractive index of the first overcoating layer 520 may be approximately 0.10 or more, approximately 0.11 or more, approximately 0.12 or more, approximately 0.13 or more, approximately 0.14 or more, approximately 0.15 or more, or approximately 0.20 or more. As a non-limiting example, the refractive index of the pattern of linear features 511 may be approximately 1.55 to 1.8, and the refractive index of the first overcoating layer 520 may be approximately 1.3 to 1.55. In some exemplary embodiments where the pattern of linear features 511 include or is made of an organic material, the pattern of linear features 511 may further include a photosensitive material.

The difference between the refractive index of the pattern of linear features 511 and the refractive index of the first overcoating layer 520 may be less than 0.5. If, the difference between the refractive index of the pattern of linear features 511 and the refractive index of the first overcoating layer 520, which are in contact with each other to form the optical interface, is equal to or greater than 0.5, the critical angle at which the total reflection occurs at the optical interface decreases such that the total amount of light that is totally reflected increases too much. As a result, the display quality is drastically deteriorated. In addition, there may be a problem that the polarized light passing therethrough is depolarized by the pattern of linear features 511.

In an exemplary embodiment, the first overcoating layer 520 may include an organic material such as acrylic resin, and the pattern of linear features 511 may include a metallic material such as magnesia having a higher refractive index than that of acrylic resin. Alternatively, the first overcoating layer 520 may include porous silicon, and the pattern of linear features 511 may include an organic material such as acrylic resin having a higher refractive index than that of porous silicon. In another exemplary embodiment, the refractive index of the first overcoating layer 520 may be greater than the refractive index of the pattern of linear features 511. For example, the refractive index of the first overcoating layer 520 may be approximately 1.55 to 1.8, and the refractive index of the pattern of linear features 511 may be approximately 1.3 to 1.55. As mentioned earlier, the difference between the refractive index of the pattern of linear features 511 and the refractive index of the first overcoating layer 520 may be approximately 0.10 or more, approximately 0.11 or more, approximately 0.12 or more, approximately 0.13 or more, approximately 0.14 or more, approximately 0.15 or more, or approximately 0.20 or more. In addition, the difference between the refractive index of the pattern of linear features 511 and the refractive index of the first overcoating layer 520 may be less than 0.5.

The pattern of linear features 511 may be extended in the second direction Y. In addition, the linear features may be spaced apart from one another in the first direction X. In an exemplary embodiment, for example, the linear features may extend in a direction parallel to the transmission axis (e.g., the second direction Y) of the upper polarizer 621 to be described later. When the light provided from the light source unit BLU passes through the lower polarizer 610, the liquid-crystal layer 30 and the upper polarizer 621 in this order, by aligning the direction in which the linear features 511 are extended with the transmission axis of the upper polarizer 621, it is possible to suppress that the directors of the polarized light controlled by aligning the liquid crystals 35 in the liquid-crystal layer 30 are changed by the pattern of linear features 511.

The width of the pattern of linear features 511 may gradually decrease from the second base 120 toward the liquid-crystal layer 30. In an exemplary embodiment, for example, the pattern of linear features 511 may be tapered toward the lower surface thereof. FIG. 3 illustrates an example where the cross section of the pattern of linear features 511 along the first direction X is an inverted trapezoidal shape. It is, however, to be understood that this is merely illustrative. The cross section of the pattern of linear features 511 may have substantially the same shape along the extending direction (i.e., the second direction Y).

As the width of the pattern of linear features 511 decreases from the second base 120 toward the liquid-crystal layer 30, the side surface of the pattern of linear features 511 may have an inclination. The pattern of linear features 511 includes the inclined surfaces, and accordingly the inclined optical interfaces corresponding to the inclined surfaces may be formed between the pattern of linear features 511 and the first overcoating layer 520 such that the light incident on the linear patterned layer 501 can be partially diffused. In an exemplary embodiment, the angle of inclination θ of the side surfaces of the pattern of linear features 511 may be greater than approximately 30 degrees and less than 90 degrees, greater than approximately 40 degrees and less than 90 degrees, or greater than approximately 45 degrees and less than 90 degrees. As used herein, the "inclination angle of the pattern of linear feature" refers to the angle defined by the upper surface (i.e., xy-plane) having a maximum width $W_1$ and a side surface having an inclination of the pattern of linear features 511 in the cross section cut along the first direction X. If the inclination angle θ of the pattern of linear features 511 is 45 degrees or more, a predetermined ratio between the maximum width $W_1$ and the height H of the pattern of linear features 511 can be established such that the linear patterned layer 501 may have light diffusion characteristics.

The lower limit of the maximum width $W_1$ of the pattern of linear features 511 in the first direction X, for example, the width of the upper surface of the pattern of linear features 511 (see FIG. 3), may be approximately 1.5 μm. By making the maximum width $W_1$ of the pattern of linear features 511 sufficiently larger than the wavelength of the incident light, e.g., more than twice the wavelength of the incident light, it is possible to prevent the polarization state of the transmitted light given by the liquid-crystal layer 30 from being depolarized. In addition, the upper limit of the maximum width $W_1$ of the pattern of linear features 511 may be approximately 5.0 μm. By making the maximum width $W_1$ of the pattern of linear features 511 be 5.0 μm or less, the light after passing through the linear patterned layer 501 can include more diffused light components than the straight light components. That is, by making the maximum width $W_1$ of the pattern of linear features 511 to be 5.0 μm or less, the linear patterned layer 501 can exhibit better light diffusion function than the light condensing function.

The spacing distance $D_1$ between the adjacent linear features in the first direction X may be chosen taking into account the maximum width $W_1$ of the pattern of linear features 511. In an exemplary embodiment, a ratio $D_1/W_1$ of the spacing distance $D_1$ of the linear features to the maximum width $W_1$ of the pattern of linear features 511 may be approximately 0.5 to 2.0, approximately 0.5 to 1.5, or approximately 0.5 to 1.0. When the ratio $D_1/W_1$ of the spacing distance $D_1$ to the maximum width $W_1$ of the pattern of linear features 511 is 0.5 or more, the linear patterned layer 501 can be given diffusion characteristics without substantially decreasing the brightness of the light passing through the display panel DP. If the ratio $D_1/W_1$ of the separation distance $D_1$ to the maximum width $W_1$ of the pattern of linear features 511 is too large, the diffusion characteristics of the linear patterned layer 501 may be trivial. In an exemplary embodiment, the lower limit of the spacing distance $D_1$ between the adjacent linear features in the first direction X may be approximately 0.8 μm, and the upper limit thereof may be approximately 10.0 μm, approximately 9.0 μm, approximately 8.0 μm, approximately 7.0 μm, approximately 6.0 μm, or approximately 5.0 μm.

The height H of the pattern of linear features 511 in the third direction Z may be selected taking into account the maximum width $W_1$ of the pattern of linear features 511. In an exemplary embodiment, a ratio $H/W_1$ of the height H to the maximum width $W_1$ of the pattern of linear features 511 may be approximately 0.5 to 1.5, approximately 0.5 to 1.4, approximately 0.5 to 1.3, or approximately 0.5 to 1.2. When the ratio $H/W_1$ of the height H to the maximum width $W_1$ of the pattern of linear features 511 is 0.5 or more, the polarized light passing through the pattern of linear features 511 is not depolarized, such that the direction of the polarized light controlled by the liquid-crystal layer 30 can be maintained. In an exemplary embodiment, the lower limit of the height H of the pattern of linear features 511 may be approximately 0.75 μm, approximately 0.80 μm, approximately 0.90 μm, or approximately 1.0 μm. By making the height H of the pattern of linear features 511 larger than the wavelength of the incident light, it is possible to prevent the polarization state of the transmitted light given by the liquid-crystal layer 30 from being depolarized by the pattern of linear features 511.

In addition, if the ratio $H/W_1$ of the height H to the maximum width $W_1$ of the pattern of linear features 511 is larger than 1.5, the light after passing through the linear patterned layer 501 may fail to fully contribute to displaying images by the liquid-crystal display device 1. For example, when the ratio $H/W_1$ of the height H to the maximum width $W_1$ of the pattern of linear features 511 is greater than 1.5, a significant amount of the transmitted light may be totally reflected off the optical interface between the linear patterned layer 501 and the second base 120, such that the out-coupling efficiency of the display panel DP may be remarkably reduced. As a non-limiting example, the upper limit of the height H of the pattern of linear features 511 may be approximately 10.0 μm, approximately 9.0 μm, approximately 8.0 μm, approximately 7.0 μm, approximately 6.0 μm, or approximately 5.0 μm.

On the other hand, the maximum width $W_1$ of the pattern of linear features 511 may be selected taking into account the cell gap G of the liquid-crystal layer 30. In an exemplary embodiment, for example, a ratio $W_1/G$ of the maximum width $W_1$ of the pattern of linear features 511 to the cell gap G of the liquid-crystal layer 30 may be approximately 0.5 to 2.0, approximately 0.5 to 1.9, approximately 0.5 to 1.8, approximately 0.5 to 1.7, approximately 0.5 to 1.6, or approximately 0.5 to 1.5.

If the ratio $W_1/G$ of the maximum width $W_1$ of the pattern of linear features 511 to the cell gap G is 0.5 or more, it is possible to sufficiently rotate the polarization direction of incident light having a certain wavelength by using the liquid-crystal layer 30, e.g., in the range of approximately 90 degrees or less, and it is possible to prevent the pattern of linear features 511 from interfering with the polarization state of the light having the wavelength. In addition, if the ratio $W_1/G$ of the maximum width $W_1$ of the pattern of linear features 511 to the cell gap G is larger than 1.5, color mixture defects or the like may occur such that the display quality of the liquid-crystal display device 1 may remarkably decrease.

In some exemplary embodiments, the maximum width $W_1$ of the pattern of linear features 511 may be greater than the cell gap G of the liquid-crystal layer 30. In this case, the luminance as well as visibility from side angles of the liquid-crystal display device 1 can be improved.

The minimum width $W_2$ of the pattern of linear features 511 in the first direction X, e.g., the width of the lower surface of the pattern of linear features 511 (see FIG. 3) may be smaller than the maximum width $W_1$ of the pattern of linear features 511. The minimum width $W_2$ of the pattern of linear features 511 may have certain relationships with the maximum width $W_1$, the height H and the inclination angle θ of the pattern of linear features 511. Although FIG. 3 depicts an example where the width $W_2$ of the lower surface of the pattern of linear features 511 is larger than 0 and has a predetermined area, the two inclined surfaces (the side surfaces) of a linear feature of the pattern of linear features 511 may meet each other to form a vertex in another exemplary embodiment. In other words, the minimum width $W_2$ of the pattern of linear features 511 may be zero.

The linear patterned layer 501 including the pattern of linear features 511 may diffuse at least a part of the transmitted light through the side surfaces in the first direction X. That is, the linear features extending in the second direction Y and spaced apart from one another in the first direction X may diffuse the transmitted light in the spacing direction (i.e., the first direction X) much more than in the extending direction (i.e., the second direction Y). In other words, the linear patterned layer 501 may have the optical anisotropy, i.e., the diffusion characteristic in one direction is larger than that in another direction on the plane.

In an exemplary embodiment where the liquid-crystal display device 1 and the display panel DP have the longer sides in the first direction X and the shorter sides in the second direction Y, the above-described linear patterned layer 501 can allow the light exiting from the liquid-crystal display device 1 to scatter in the longer axis direction (i.e., first direction X). In this manner, the difference in brightness, contrast or color coordinates between the image perceived by a viewer in front of the liquid-crystal display device 1 and the image perceived by a viewer watching the liquid-crystal display device 1 from a side in the longer axis direction thereof can be reduced, thereby improving the visibility from side angles in the longer axis direction of the liquid-crystal display device 1. On the other hand, since the light contributing to displaying images can be prevented from scattering in the shorter axis direction of the liquid-crystal display device 1, it can include a sufficient straight light component, and thereby reproducing a clear image without lowering luminance or the like.

A light-blocking element 430 may be disposed on the linear patterned layer 501. The light-blocking element 430 can block the transmission of light. In an exemplary embodiment, for example, the light-blocking element 430 may include a colorant such as a black pigment and a black dye or may be made of a metal material. The light-blocking element 430 may be disposed on the boundary between adjacent pixels in a plan view to prevent color mixing defects between the pixels. In an exemplary embodiment, for example, the light-blocking element 430 may have a substantially lattice-like shape defining openings corresponding to the pixels PX1 and PX2 in a plan view. The light-blocking element 430 may partially overlap with the pattern of linear features 511 of the linear patterned layer 501 in a plan view. As used herein, the phase "element A overlaps with element B" means that they overlap with each other in the third direction Z (i.e., in a plan view), unless stated otherwise.

In some exemplary embodiments of the invention, a second overcoating layer 450 may be disposed on the light-blocking element 430. The second overcoating layer 450 may be a planarization layer that reduces a level difference occurred by the light-blocking element 430 or the like disposed on the second base 120. The second overcoating layer 450 is not particularly limited in its material as long as it is a material having excellent planarization characteristics and light transmittance. In an exemplary embodiment, for example, the second overcoating layer 450 may be an organic layer including an organic material such as an epoxy resin, an acrylic resin, an imide resin, a cardo resin, a siloxane resin and a silsesquioxane resin. In another exemplary embodiment, the second overcoating layer 450 may be omitted.

The common electrode 820 may be disposed on the second overcoating layer 450. In an exemplary embodiment, for example, the common electrode 820 may be disposed directly on the second overcoating layer 450. The common electrode 820 may be disposed across the first pixel PX1 and the second pixel PX2 and may receive a common voltage. The common electrode 820 may generate an electric field together with the pixel electrodes 810. The common electrode 820 may include or be made of a transparent conductive material like the pixel electrode 810.

In some exemplary embodiments of the invention, a second alignment layer 920 may be disposed on the common electrode 820. The second alignment layer 920 may induce an initial orientation of the liquid crystals 35 in the liquid-crystal layer 30. Like the first alignment layer 910, the second alignment layer 920 may be a vertical alignment layer that has an imide group in a repeating unit of the main chain and has a vertical aligner introduced as a side chain.

The upper polarizer 621 may have a polarizing function. The upper polarizer 621 may be either an absorptive polarizer or a reflective polarizer. The upper polarizer 621 may be disposed between the liquid-crystal layer 30 and a viewer (not shown). That is, the upper polarizer 621 and the lower polarizer 610 may be spaced apart from each other with the liquid-crystal layer 30 interposed therebetween. In addition, the upper polarizer 621 and the liquid-crystal layer 30 may be spaced apart from each other with the linear patterned layer 501 interposed therebetween.

In an exemplary embodiment, the upper polarizing element 621 may be disposed on a main surface of the second base 120 (shown as the upper surface in FIG. 2). The upper polarizer 621 may be disposed directly on the main surface of the second base 120, may be coupled with the second base 120 via an adhesive layer (not shown), or may be spaced apart from the second base 120. The transmission axis of the upper polarizer 621 may be substantially parallel to the second direction Y. In an exemplary embodiment, for example, the upper polarizer 621 may transmit components of the polarized light parallel to the direction in which the pattern of linear features 511 is extended (i.e., the second direction Y), and may block components of the polarized light parallel to the direction in which the linear features are spaced apart from one another (i.e., the first direction X).

Although FIG. 2 depicts an example where the upper polarizer 621 is disposed on the upper surface of the second base 120, this is merely illustrative. In other exemplary embodiments, the upper polarizer 621 may be disposed at any location between a viewer (not shown) and the linear patterned layer 501 (e.g., between the second base 120 and the linear patterned layer 501), between the linear patterned layer 501 and the light-blocking element 430, between the light-blocking element 430 and the second overcoating layer 450, or between the second overcoating layer 450 and the common electrode 820.

Hereinafter, other exemplary embodiments of the invention will be described. The description on substantially the identical elements as the liquid-crystal display device 1 according to the above-described exemplary embodiment will be omitted, which will be clearly understood by those skilled in the art from the accompanying drawings.

Figure 4:
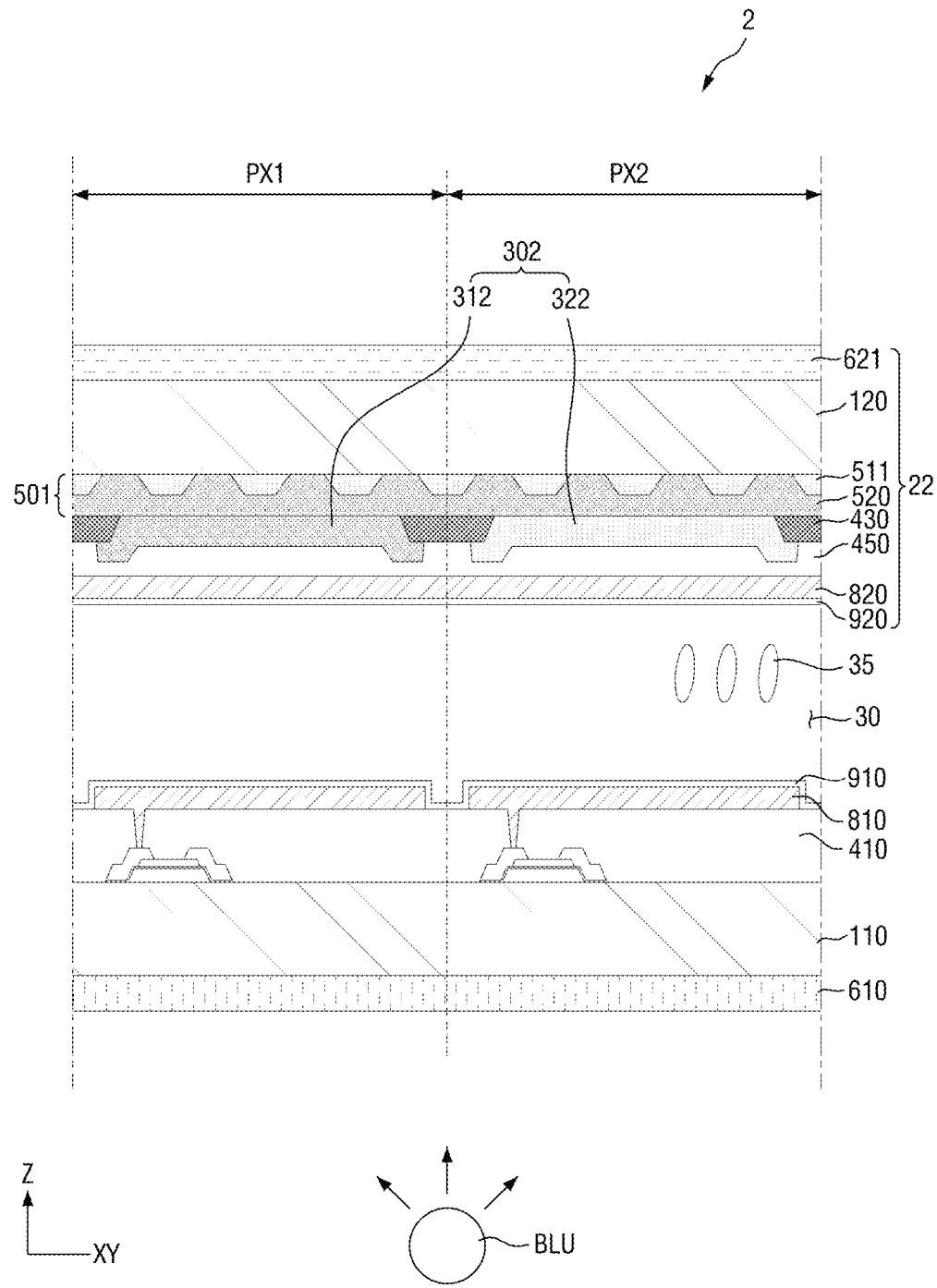
FIG. 4 is a cross-sectional view of another exemplary embodiment of a liquid-crystal display device according to the invention.

FIG. 4 is a cross-sectional view of another exemplary embodiment of a liquid-crystal display device according to the invention.

Referring to FIG. 4, a liquid-crystal display device 2 according to this exemplary embodiment is different from the liquid-crystal display device 1 according to the exemplary embodiment shown in FIG. 2 and the like in that a color conversion pattern layer 302 is disposed between the liquid-crystal layer 30 and the upper polarizer 621.

In an exemplary embodiment, the top substrate 22 may be a color conversion substrate that includes a second base 120, a common electrode 820, an upper polarizer 621 and a linear patterned layer 501, and further includes a color conversion pattern layer 302.

The color conversion pattern layer 302 may be disposed on the light-blocking element 430. The color conversion pattern layer 302 may include a first color conversion pattern 312 disposed in the first pixel PX1, and a second color conversion pattern 322 disposed in the second pixel PX2. In an exemplary embodiment, for example, the first color conversion pattern 312 may be a color filter that selectively absorbs the green and/or red wavelength bands, while the second color conversion pattern 322 may be a color filter that selectively absorbs the blue and/or red wavelength bands.

In the liquid-crystal display device 2 according to this exemplary embodiment, the linear patterned layer 501 contributing to the improvement of the viewing angle is disposed after the light-blocking element 430 on the light path from the light source unit BLU to a viewer (not shown) such that the display quality of the liquid-crystal display device 2 can be further improved. That is, the display quality of the liquid-crystal display device 2 can be improved by disposing the linear patterned layer 501 and the light source unit BLU spaced apart from each other with the color conversion pattern layer 302 and the light-blocking element 430 therebetween.

In an exemplary embodiment, for example, the color conversion pattern layer 302 may be used to make the transmitted light have a particular color, and then the light-blocking element 430 may prevent the color mixture defect of the light passing through each of the pixels. Then, at least a part of the transmitted light is diffused by the linear patterned layer 501 such that it scatters in the first direction X, thereby improving the visibility from side angles of the liquid-crystal display device 2 in the first direction X, (e.g., in the longer axis direction).

In some exemplary embodiment of the invention, a second overcoating layer 450 may be disposed between the color conversion pattern layer 302 and the common electrode 820.

Figure 5:
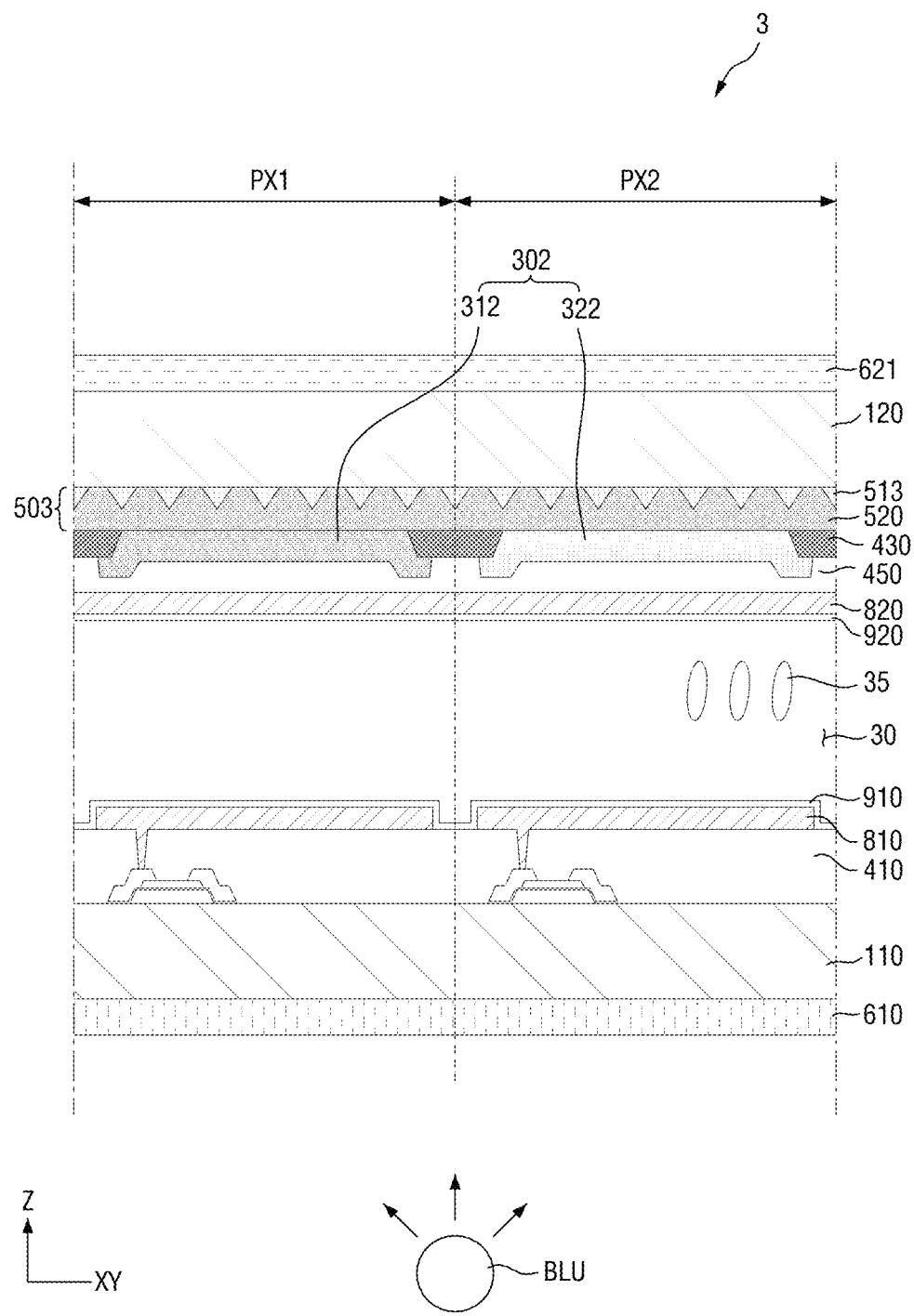
FIGS. 5 to 12 are cross-sectional views of other exemplary embodiments of a liquid-crystal display device according to the invention.

FIG. 5 is a cross-sectional view of still another exemplary embodiment of a liquid-crystal display device according to the invention.

Referring to FIG. 5, a liquid-crystal display device 3 according to this exemplary embodiment is different from the liquid-crystal display device 2 according to the exemplary embodiment shown in FIG. 4 in that the side surfaces of the linear feature in the pattern of linear features 513 meet to form a vertex and there is no the lower surface of a pattern of linear features 513 parallel to the xy-plane.

In an exemplary embodiment, for example, in a cross section of a feature of the pattern of linear features 513 cut in the first direction X, the cross section of the pattern of linear features 513 may be an inverted triangle. That is, the cross section of the pattern of linear features 513 may have a wedge shape. The inclination angle, the maximum width, the spacing distance, the height and the like of the linear features of the pattern of linear features 513 according to this exemplary embodiment may be selected within the range described above with reference to FIG. 3.

Figure 6:
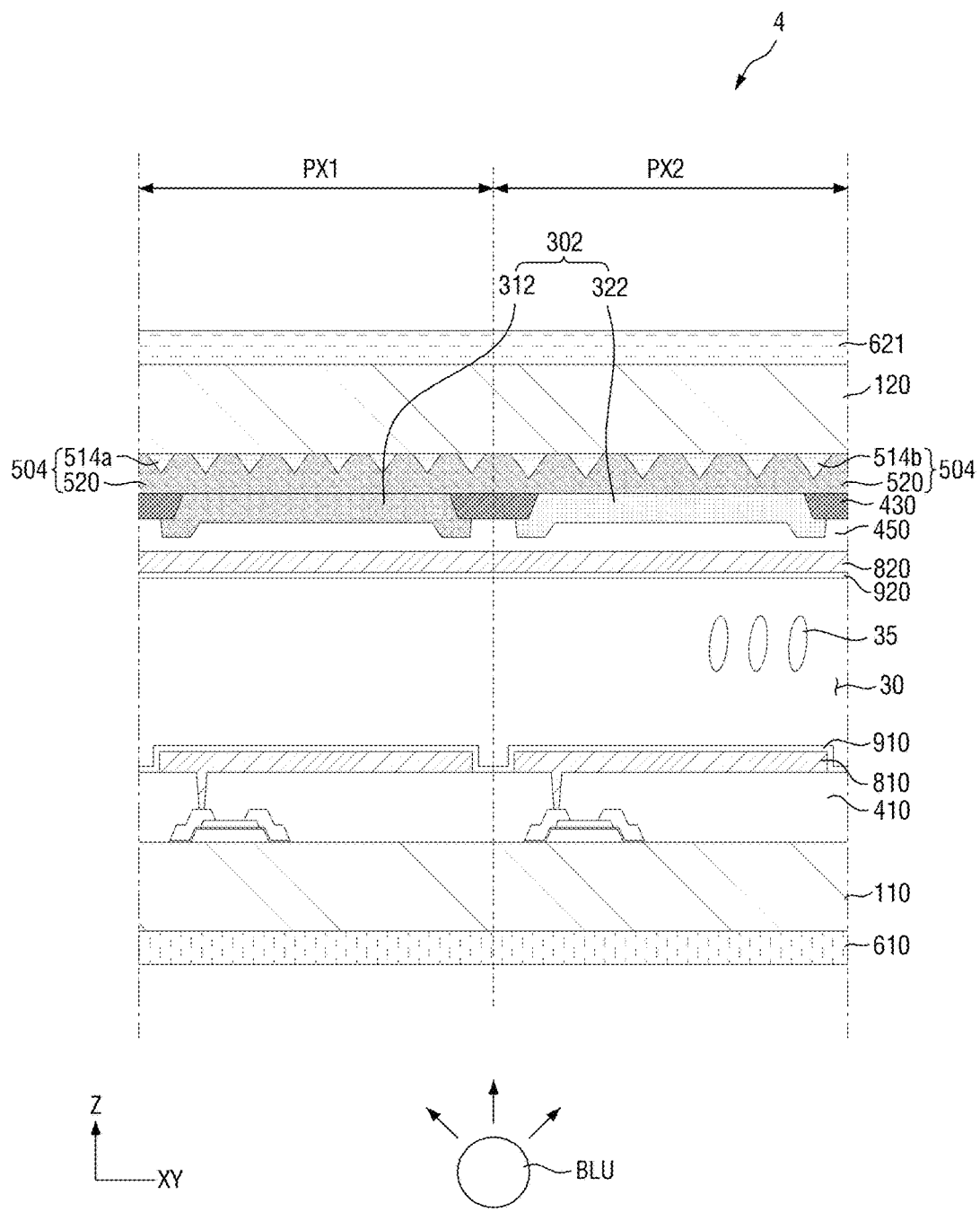

FIG. 6 is a cross-sectional view of still another exemplary embodiment of a liquid-crystal display device according to the invention.

Referring to FIG. 6, a liquid-crystal display device 4 according to this exemplary embodiment is different from the liquid-crystal display device 3 according to the exemplary embodiment shown in FIG. 5 in that a plurality of patterns of linear features in a linear patterned layer 504 includes a first pattern of linear features 514*a* and a second pattern of linear features 514*b* having different sizes.

In this exemplary embodiment, a first pixel PX1 is a pixel for representing blue color, and a second pixel PX2 is a pixel for representing green color having a peak wavelength longer than that of blue color.

The linear patterned layer 504 may include a plurality of patterns of linear features 514*a* and 514*b*, and the plurality of patterns of linear features 514*a* and 514*b* may include a first pattern of linear features 514*a* disposed in the first pixel PX1 and a second pattern of linear features 514*b* disposed in the second pixels PX2. The first pattern of linear features 514*a* and the second pattern of linear features 514*b* may extend in the second direction Y. In addition, the linear features of the first pattern of linear features 514*a* may be spaced apart from one another in the first direction X, and the linear features of the second pattern of linear features 514*b* may be spaced apart from one another in the first direction X. The first pattern of linear features 514*a* and the second pattern of linear features 514*b* adjacent to each other may be spaced apart in the first direction X.

The first pattern of linear features 514*a* and the second pattern of linear features 514*b* may include or be made of the same transparent, organic or inorganic material and may have substantially the same refractive index.

In an exemplary embodiment, the size of the linear feature of the second pattern 514*b* may be greater than the size of the linear feature of the first pattern 514*a*. In an exemplary embodiment, for example, the maximum width (shown as the upper surface in FIG. 6) of the linear feature of the second pattern 514*b* is greater than the maximum width of the linear feature of the first pattern of 514*a*, and/or the height of the linear feature of the second pattern 514*b* in the third direction Z may be greater than the height of the linear feature of the first pattern 514*a*. In another exemplary embodiment, the maximum width or the height of the linear feature of the second pattern 514*b* and the first pattern 514*a* may be substantially the same.

The light incident on the linear patterned layer 504 after having passed through the color conversion pattern layer 302 may have different wavelength bands in different pixels. In an exemplary embodiment, for example, the light incident on the linear patterned layer 504 in the first pixel PX1 has a blue light wavelength band, and the light incident on the linear patterned layer 504 in the second pixel PX2 has a green light wavelength band. In this case, the diffusion efficiency of the transmitted light in the first direction X by the linear patterned layer 504 may be different for different wavelength bands. In an exemplary embodiment, for example, the diffusion efficiency of the blue light wavelength band by the first pattern of linear features 514*a* may be higher than the diffusion efficiency of the blue light wavelength band by the second pattern of linear features 514*b* which is larger than the first pattern of linear features 514*a*. The diffusion efficiency of the green light wavelength band by the second pattern of linear features 514*b* may be higher than the diffusion efficiency of the green light wavelength band by the first pattern of linear features 514*a* which is smaller than the second pattern of linear features 514*b*. As described above, the maximum width, height and the like of the patterns of linear features 514*a* and 514*b* are larger than the wavelength of the transmitted light, thereby preventing the polarization state of the transmitted light from being depolarized by the patterns of linear features 514*a* and 514*b*. It is, however, to be understood that this is merely illustrative.

Therefore, in the liquid-crystal display device 4 according to this exemplary embodiment, the first pattern of linear features 514*a* in the first pixel PX1 representing blue color has an excellent diffusion efficiency with respect to blue light compared to green light and has such a size that it does not depolarize the polarized light. In addition, the second pattern of linear features 514*b* in the second pixel PX2 has an excellent diffusion efficiency with respect to green light as compared with blue light and has such a size that it does not depolarize the polarized light. As a result, the visibility from side angles of the liquid-crystal display device 4 can be further improved.

The inclination angle, maximum width, spacing distance, height, etc. of each of the linear features of the first pattern of linear features 514*a* and the second pattern of linear features 514*b* may be selected within the range described above with reference to FIG. 3 and the like.

In another exemplary embodiment, the size of the first pattern of linear features 514*a* in the first pixel PX1 may be larger than the size of the second pattern of linear features 514*b* in the second pixel PX2.

Figure 7:
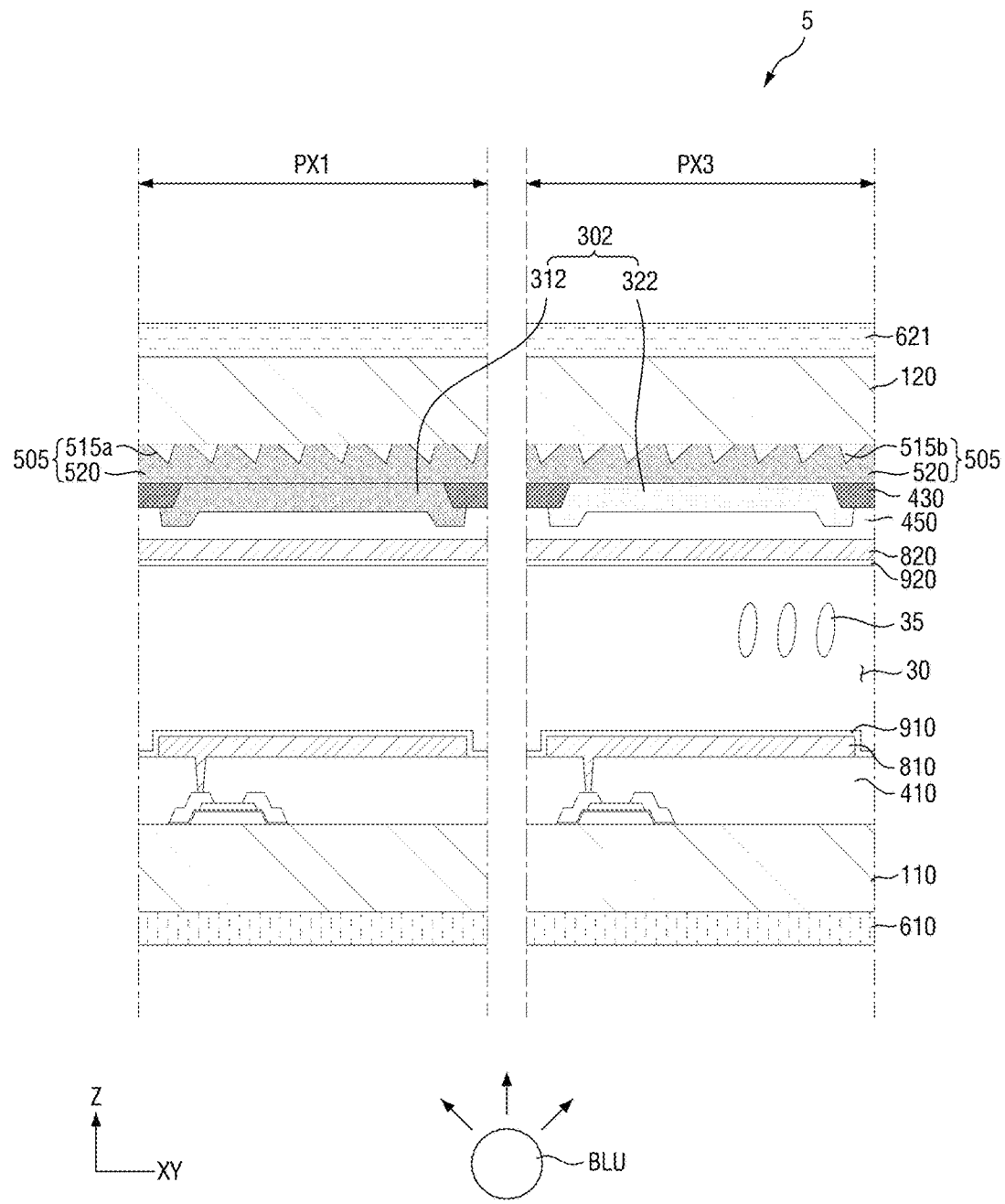
Figure 8:
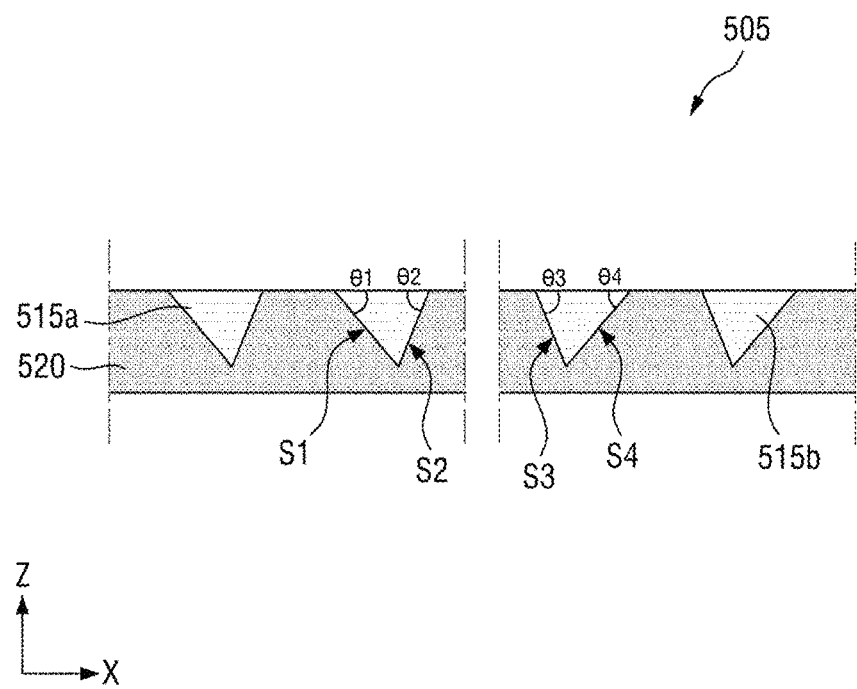

FIG. 7 is a cross-sectional view of still another exemplary embodiment of a liquid-crystal display device according to the invention. FIG. 8 is a view of an exemplary embodiment of the linear patterned layer shown in FIG. 7.

Referring to FIGS. 7 and 8, a liquid-crystal display device 5 according to this exemplary embodiment is different from the liquid-crystal display device 3 according to the exemplary embodiment shown in FIG. 5 in that a linear patterned layer 505 includes a first pattern of linear features 515*a* and a second pattern of linear features 515*b* each linear feature of which has different inclination angles at two side surfaces and disposed symmetric with each other.

In this exemplary embodiment, a first pixel PX1 and a third pixel PX3 may be arranged in the first direction X. That is, the third pixel PX3 may be located on a side of the first pixel PX1 in the first direction X. In an exemplary embodiment, for example, the first pixel PX1 may be on the left side while the third pixel PX3 may be located on the right side of the display panel DP with respect to an imaginary line (hereinafter referred to as a center line) extending in the second direction Y passing through the center of the display panel DP in a plan view. It is, however, to be understood that this is merely illustrative. The first pixel PX1 and the third pixel PX3 may represent the same color or different colors.

The linear patterned layer 505 may include a plurality of patterns of linear features 515a and 515b, and the plurality of patterns of linear features 515a and 515b may include a first pattern of linear features 515a disposed in the first pixel PX1 and a second pattern of linear features 515b disposed in the third pixels PX3. The first pattern of linear features 515a and the second pattern of linear features 515b may extend in the second direction Y. In addition, the linear features of the first pattern of linear features 515a may be spaced apart from one another in the first direction X, and linear features of the second pattern of linear features 514b may be spaced apart from one another in the first direction X. The first pattern of linear features 515a and the second pattern of linear features 515b adjacent to each other may be spaced apart in the first direction X.

Each feature of the first pattern of linear features 515a may include a first side surface S1 on one side and a second side surface S2 on the other side in the first direction X. In an exemplary embodiment, the first side surface S1 and the second side surface S2 may have different inclinations. In an exemplary embodiment, for example, each of a first inclination angle θ1 defined by the first side surface S1 with respect to the xy-plane and a second inclination angle θ2 defined by the second side surface S2 with respect to the xy-plane may be equal to or greater than 30 degrees and less than 90 degrees, and the second inclination angle θ2 may be larger than the first inclination angle θ1.

In addition, each feature of the second pattern of linear features 515b may include a third side surface S3 on one side and a fourth side surface S4 on the other side in the first direction X. In an exemplary embodiment, the third side surface S3 and the fourth side surface S4 may have different inclinations. In an exemplary embodiment, for example, each of a third inclination angle θ3 defined by the third side surface S3 with respect to the xy-plane and a fourth inclination angle θ4 defined by the fourth side surface S4 with respect to the xy-plane may be equal to or greater than 30 degrees and less than 90 degrees, and the third inclination angle θ3 may be larger than the fourth inclination angle θ4.

In some exemplary embodiment of the invention, the first inclination angle θ1 of the first pattern of linear features 515a may be substantially equal to the fourth inclination angle θ4 of the second pattern of linear features 515b, and the second inclination angle θ2 of the first pattern of linear features 515a may be substantially equal to the third inclination angle θ3 of the second pattern of linear features 515b. That is, the first pattern of linear features 515a in the first pixel PX1 and the second pattern of linear features 515b in the third pixel PX3 may be arranged symmetrically with respect to the center line.

The linear patterned layer 505 including the first pattern of linear features 515a and the second pattern of linear features 515b may diffuse the transmitted light in the first direction X. The first pattern of linear features 515a or the second pattern of linear features 515b having different inclination angles of one side surface and the other side surface may induce the diffused, transmitted light to travel differently in both direction of the first direction X.

In an exemplary embodiment in which the first pixel PX1 is located on the left side while the third pixel PX3 is located on the right side of the display panel DP, the first pixel PX1 is configured to further enhance the visibility from the right angle more than the visibility from the left angle, while the third pixel PX3 is configured to further enhance the visibility from the left angle more than the visibility from the right angle. By doing so, the display quality of the liquid-crystal display device 5 can be further improved. It is, however, to be understood that this is merely illustrative.

In another exemplary embodiment, the first inclination angle θ1 of the first pattern of linear features 515a in the first pixel PX1 may be larger than the second inclination angle θ2 and/or the fourth inclination angle θ4 of the second pattern of linear features 515b in the third pixel PX3 may be larger than the third inclination angle θ3.

Figure 9:
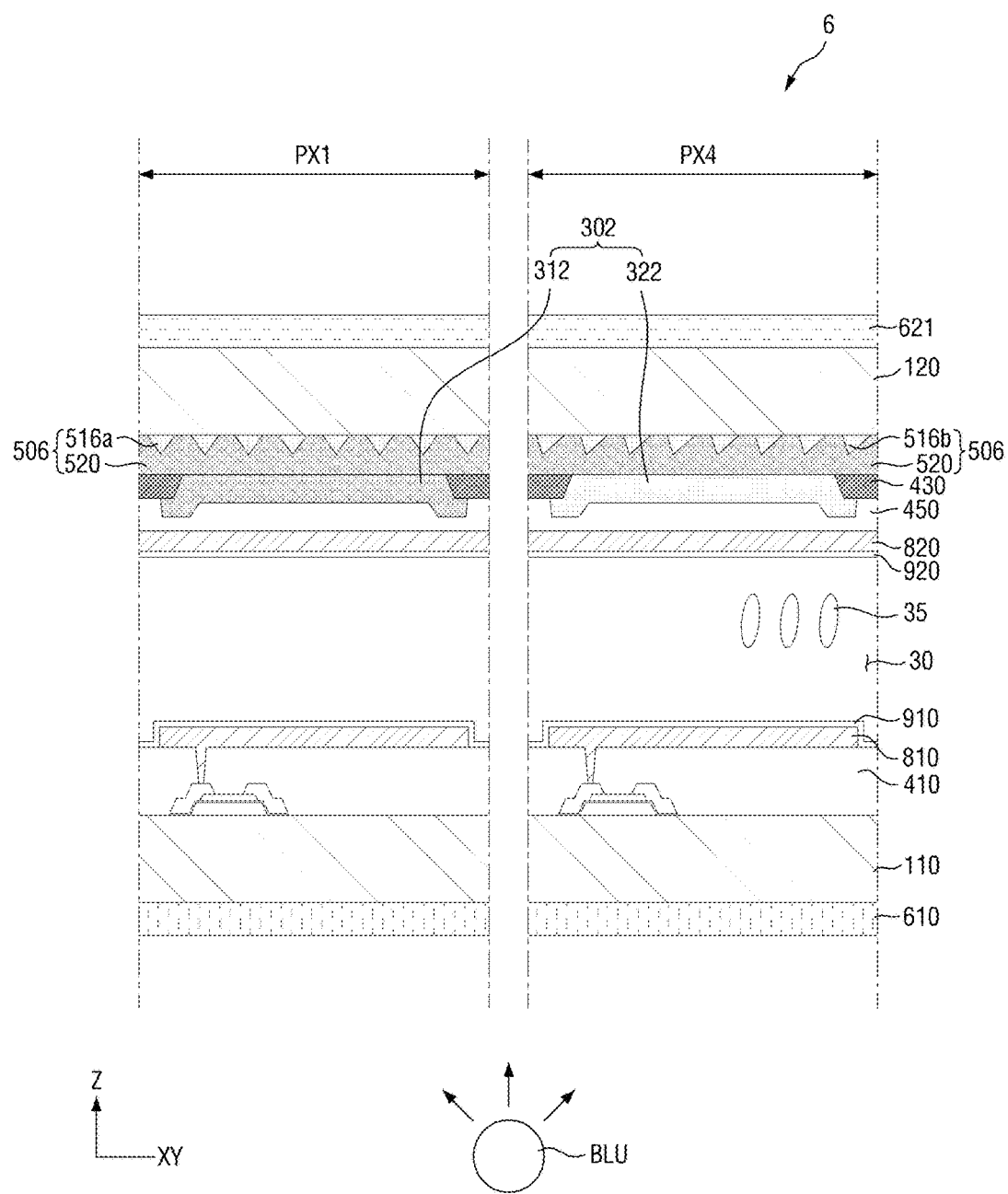
Figure 10:
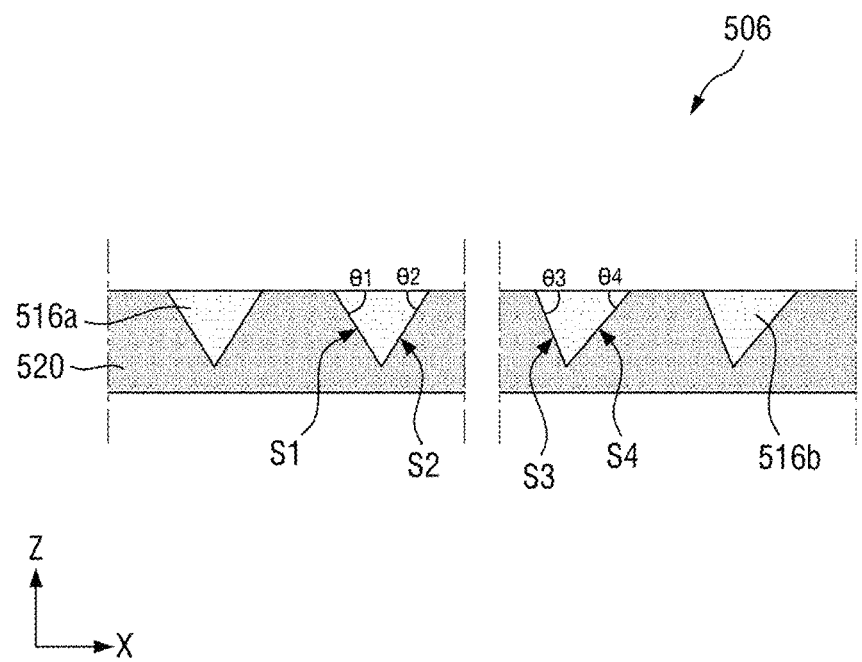

FIG. 9 is a cross-sectional view of still another exemplary embodiment of a liquid-crystal display device according to the invention. FIG. 10 is a view of an exemplary embodiment of the linear patterned layer shown in FIG. 9.

Referring to FIGS. 9 and 10, a liquid-crystal display device 6 according to this exemplary embodiment is different from the liquid-crystal display device 3 according to the exemplary embodiment shown in FIG. 5 in that a linear patterned layer 506 includes a first pattern of linear features 516a and a second pattern of linear features 516b which have different inclination angles at two side surfaces.

In this exemplary embodiment, a first pixel PX1 and a fourth pixel PX4 may be arranged in the first direction X. That is, the fourth pixel PX4 may be located on a side of the first pixel PX1 in the first direction X. For example, the fourth pixel PX4 may be located near the center line, and the first pixel PX1 may be located closer to the edge side in the first direction X than the fourth pixel PX4. It is, however, to be understood that this is merely illustrative. The first pixel PX1 and the fourth pixel PX4 may represent the same color or different colors.

The linear patterned layer 506 may include a plurality of patterns of linear features 516a and 516b, and the plurality of patterns of linear features 516a and 516b may include a first pattern of linear features 516a disposed in the first pixel PX1 and a second pattern of linear features 516b disposed in the fourth pixels PX4. The first pattern of linear features 516a and the second pattern of linear features 516b may extend in the second direction Y. In addition, the linear features of the first pattern of linear features 516a may be spaced apart from one another in the first direction X, and the linear features of the second pattern of linear features 514b may be spaced apart from one another in the first direction X. The first pattern of linear features 516a and the second pattern of linear features 516b adjacent to each other may be spaced apart in the first direction X.

Each feature of the first pattern of linear features 516a may include a first side surface S1 on one side and a second side surface S2 on the other side in the first direction X. In an exemplary embodiment, the first side surface S1 and the second side surface S2 may have the same inclination. In an exemplary embodiment, for example, a first inclination angle θ1 defined by the first side surface S1 with respect to the xy-plane and the second inclination angle θ2 defined by the second side surface S2 with respect to the xy-plane may be equal to or greater than 30 degrees and less than 90 degrees, and the second inclination angle θ2 may be equal to the first inclination angle θ1. In another exemplary embodiment, the second inclination angle θ2 may be different from the first inclination angle θ1.

In addition, each feature of the second pattern of linear features 516b may include a third side surface S3 on one side and a fourth side surface S4 on the other side in the first direction X. In an exemplary embodiment, the third side surface S3 and the fourth side surface S4 may have different inclinations. In an exemplary embodiment, for example, a third inclination angle θ3 defined by the third side surface S3 with respect to the xy-plane and a fourth inclination angle θ4 defined by the fourth side surface S4 with respect to the xy-plane may be equal to or greater than 30 degrees and less than 90 degrees, and the third inclination angle θ3 may be larger than the fourth inclination angle θ4.

In some exemplary embodiment of the invention, the first inclination angle θ1 of the first pattern of linear features 516a may be smaller than the third inclination angle θ3 of the second pattern of linear features 516b, and the second inclination angle θ2 of the first pattern of linear features 516a may be greater than the fourth inclination angle θ4 of the second pattern of linear features 516b. The first pattern of linear features 516a and the second pattern of linear features 516b may have different shapes.

The linear patterned layer 506 including the first pattern of linear features 516a and the second pattern of linear features 516b may diffuse the transmitted light in the first direction X. The second pattern of linear features 516b having different inclination angles of one side surface and the other side surface may induce the diffused, transmitted light to travel differently in both opposite directions of the first direction X.

In an exemplary embodiment in which the first pixel PX1 is located on the left edge while the fourth pixel PX4 is located on the center of the display panel DP, the fourth pixel PX4 is configured to further enhance the visibility from the left angle more than the visibility from the left side angle of the first pixel PX1. By doing so, the display quality of the liquid-crystal display device 6 can be further improved. It is, however, to be understood that this is merely illustrative.

In another exemplary embodiment, the fourth inclination angle θ4 of the second pattern of linear features 516b in the fourth pixel PX4 may be larger than the third inclination angle θ3.

Figure 11:
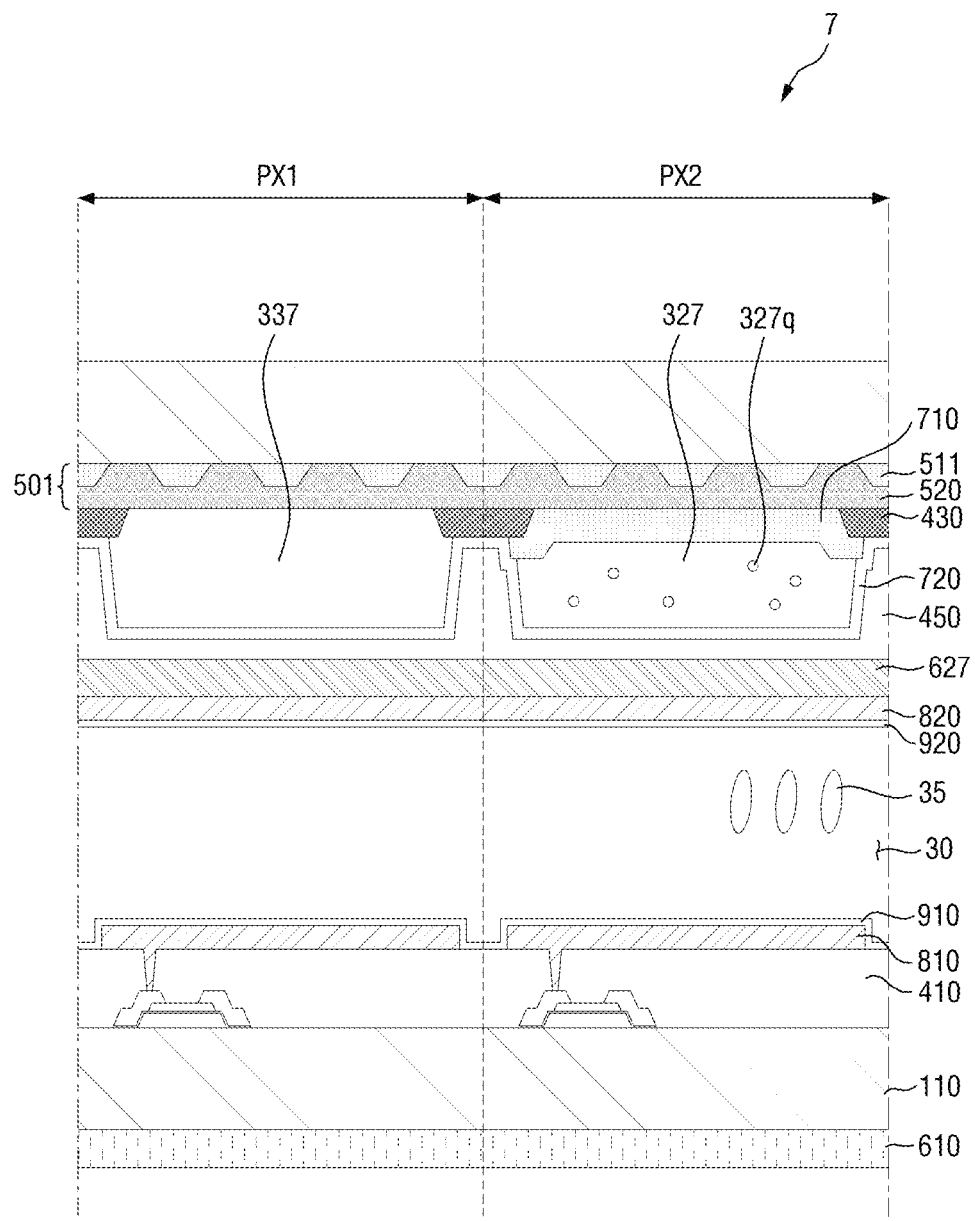
Figure 12:
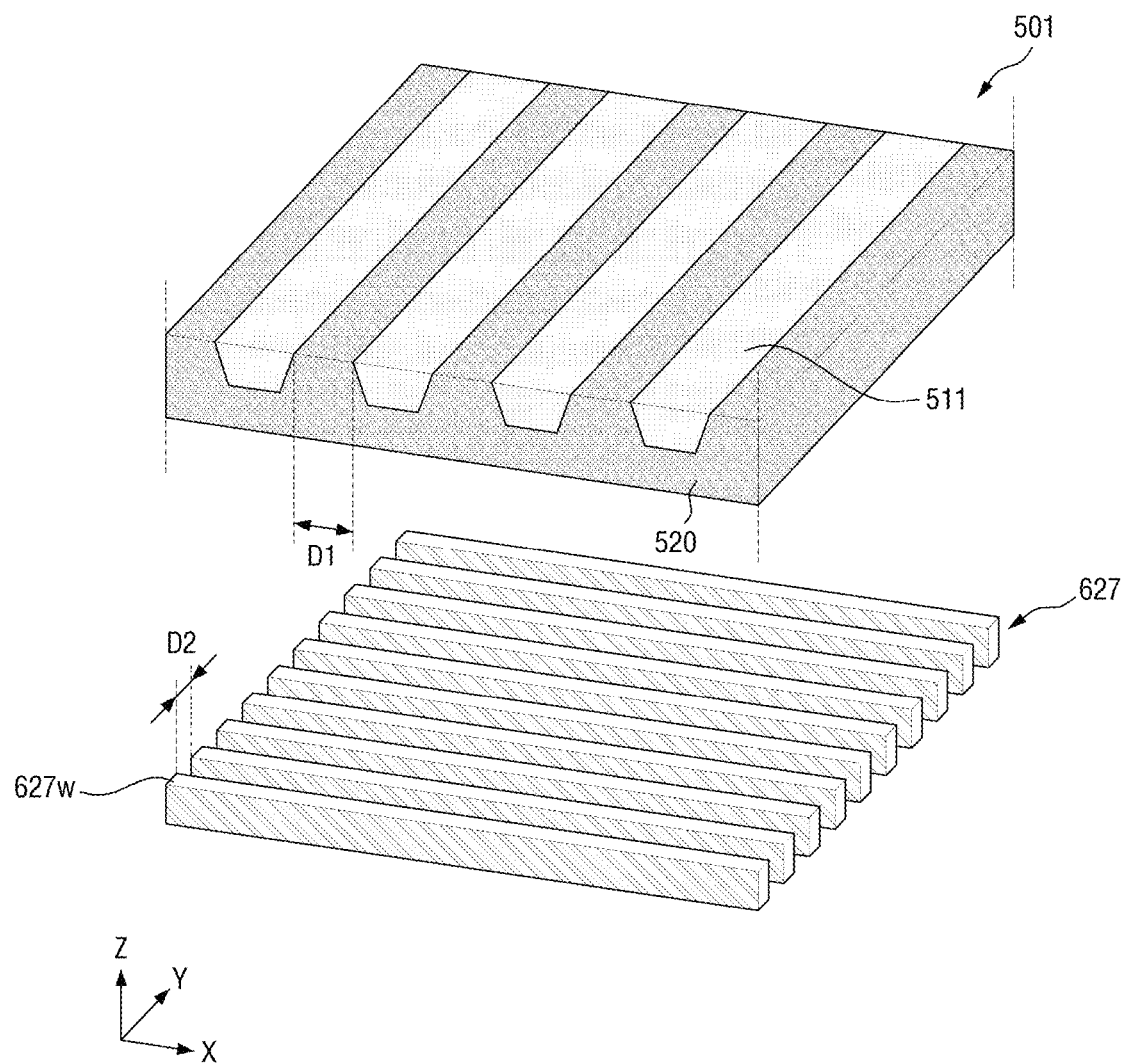

FIG. 11 is a cross-sectional view of still another exemplary embodiment of a liquid-crystal display device according to the invention. FIG. 12 is a view showing an exemplary embodiment of the linear patterned layer and the upper polarizer of FIG. 11.

Referring to FIGS. 11 and 12, a liquid-crystal display device 7 according to this exemplary embodiment is different from the liquid-crystal display device 2 according to the exemplary embodiment shown in FIG. 2 in that an upper polarizer 627 is disposed between a color conversion pattern 327 and a liquid-crystal layer 30.

In an exemplary embodiment, the upper polarizer 627 may be a reflective polarizer including a wire grid pattern layer. The wire grid pattern layer may include a pattern of wires 627w.

The direction in which the pattern of wires 627w is extended may intersect the direction in which the pattern of linear features 511 of the linear patterned layer 501 is extended. In an exemplary embodiment, for example, the pattern of wires 627w may be extended in the first direction X. In addition, the wires of the pattern 627w may be spaced apart from one another in the second direction Y. The transmission axis of the upper polarizer 627 including the pattern of wires 627w extended in the first direction X and spaced apart from one another in the second direction Y may be substantially parallel to the second direction Y. The upper polarizer 627 including the pattern of wires 627w may selectively transmit only the components of the polarized light oscillating in the direction parallel to the transmission axis while reflecting the components of the polarized light oscillating in the direction intersecting the transmission axis.

Kinds of material used in the pattern of wires 627w is not particularly limited as long as it is a material that is easy to process and has a high light reflectance. It may include, for example, a metal material. By making the pattern of wires 627w with a metal material having excellent light reflectance, it is possible to effectively reflect the components of the polarized light oscillating in the direction intersecting the transmission axis. Examples of the metal material may include aluminum (Al), silver (Ag), gold (Au), copper (Cu), titanium (Ti), molybdenum (Mo), nickel (Ni), an oxide thereof, or an alloy thereof. Although not shown in the drawings, in some exemplary embodiments, the pattern of wires 627w may be a stack of a metal pattern made of a metal material and an inorganic pattern made of a non-metallic inorganic material. Examples of the non-metallic inorganic material may include silicon oxide, silicon nitride, silicon oxynitride, silicon nitride oxide and the like. In some exemplary embodiments, the upper polarizer 627 may further include a barrier layer (not shown) disposed on and/or under the wire pattern layer that includes the pattern of wires 627w. The barrier layer may include or be made of an inorganic material such as silicon nitride or silicon oxide, or an organic material. The barrier layer can prevent corrosion or damage to the pattern of wires 627w caused by impurities such as moisture and air permeate from the outside. The barrier layer may be in contact with the second overcoating layer 450 and/or the common electrode 820.

In an exemplary embodiment, the spacing distance $D_1$ between adjacent linear features of the pattern of linear features 511 in the linear patterned layer 501 in the first direction X may be greater than the spacing distance $D_2$ between the adjacent wires of the pattern 627w in the upper polarizer 627 in the second direction Y. In an exemplary embodiment, the spacing distance $D_2$ between adjacent wires of the pattern 627w in the second direction Y may be approximately 20 to 80 nm. By making the spacing distance $D_1$ of the pattern of linear features 511 larger than the spacing distance $D_2$ of the pattern of wires 627w, it is possible to give excellent polarization function to the upper polarizer 627 and also to prevent the directors of the polarized light controlled by the liquid-crystal layer 30 from being depolarized even if the linear patterned layer 501 having light diffusion function is disposed next to the upper polarizer 627.

The color conversion pattern 327 may be disposed on the light-blocking element 430. The color conversion pattern 327 may be disposed in the second pixel PX2 but not in the first pixel PX1. The color conversion pattern 327 may convert the color of incident light such that the color of the exiting light is different from that of the incident light. In an exemplary embodiment, the color conversion pattern 327 may include a material that converts or shifts the peak wavelength of the incident light to another peak wavelength, i.e., a wavelength shift material 327q. Examples of the wavelength shift material 327q may include quantum dots, quantum rods, and fluorescent materials. In an exemplary embodiment, for example, a quantum dot can emit a color as an electron transition from conduction band to valence band. The quantum dot material may have a core-shell structure. The core may be semiconductor nanocrystalline material. Examples of the core of the quantum dots may include, but is not limited to, silicon (S1) nanocrystals, II-VI group compound nanocrystals, and III-V group compound nanocrystals, etc. In an exemplary embodiment, the wavelength shift material 327q may include a core made of cadmium selenide (CdSe), cadmium telluride (CdTe), cadmium sulfide (CdS) or indium phosphide (InP), and an outer shell made of zinc sulfide (ZnS).

In an exemplary embodiment, for example, the wavelength shift material 327q of the color conversion pattern 327 may absorb at least a part of the light provided from the light source unit BLU to emit light having a peak wavelength of green. By doing so, the color conversion pattern 327 may convert the incident light into green light, and the second pixel PX2 may represent green color.

In addition, a first wavelength band filter 710 may be disposed between the color conversion pattern 327 and the light-blocking element 430. The first wavelength band filter 710 may be a wavelength-selective optical filter that selectively transmits only light in a wavelength band including a green peak wavelength. In an exemplary embodiment, for example, the first wavelength band filter 710 may be a color filter that selectively absorbs light in a blue wavelength band. The first wavelength band filter 710 may transmit the peak wavelength of green while blocking the transmission of the light of the blue wavelength band such that the wavelength spectrum of the transmitted light is further sharpened around the peak wavelength of green represented by the second pixel PX2. As a result, the color purity of green represented by the second pixel PX2 can be improved, thereby improving the display quality of the liquid-crystal display device 7.

In some exemplary embodiments, a transparent pattern 337 may be disposed on the light-blocking element 430 in the first pixel PX1. The transparent pattern 337 may transmit the light provided by the light source unit BLU, for example, blue light without changing the color of the incident light substantially. In this manner, the first pixel PX1 can represent blue color.

A second wavelength band filter 720 may be disposed on the color conversion pattern 327 and the transparent pattern 337. The second wavelength band filter 720 may be a wavelength-selective optical filter that selectively transmits only light in a wavelength band including a peak wavelength of blue and reflects light in green and/or red wavelength bands. In an exemplary embodiment, for example, the second wavelength band filter 720 may be a distributed Bragg reflector that selectively transmits only light in the blue wavelength band. The second wavelength band filter 720 may receive light emitted from the wavelength shift material 327q and may reflect the light emitted toward the second wavelength band filter 720, thereby increasing the amount of light transmitted to a viewer (not shown) and contributing to color display. By doing so, the efficiency of utilizing of light can be increased, and display quality such as brightness and color purity of the liquid-crystal display device 7 can be improved.

Hereinafter, the invention will be described in more detail with reference to Example, Comparative Example and Experimental Example.

Example

A test cell for the liquid-crystal display device according to the exemplary embodiments of FIG. 2 and the like described above was produced. The difference in the refractive index between the linear patterned layer and the first overcoating layer was approximately 0.2.

Comparative Example

A test cell of a liquid-crystal display device having the same structure as that of the Example was produced, except that the difference in the refractive index was 0.5.

Experimental Example

Figure 13:
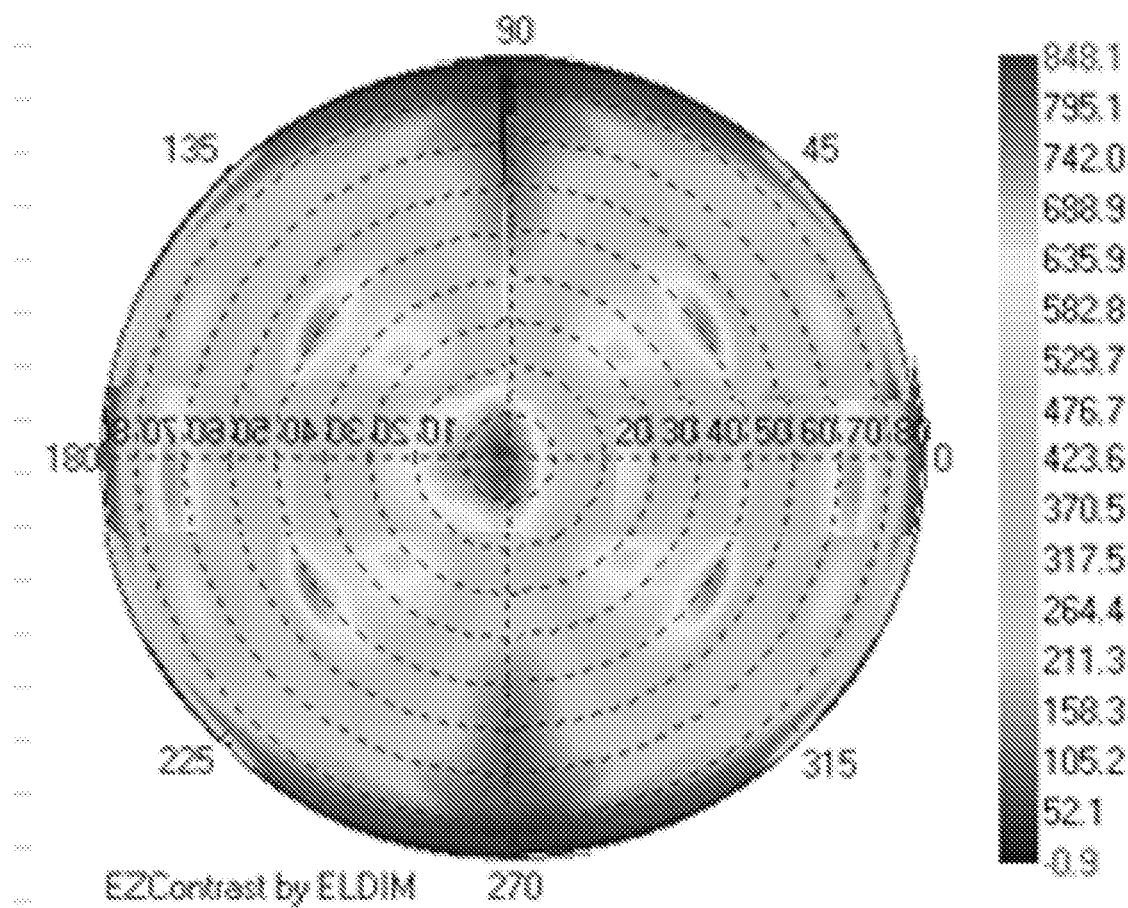
FIG. 13 is a graph showing viewing angle characteristic of the test cell produced according to Example.
Figure 14:
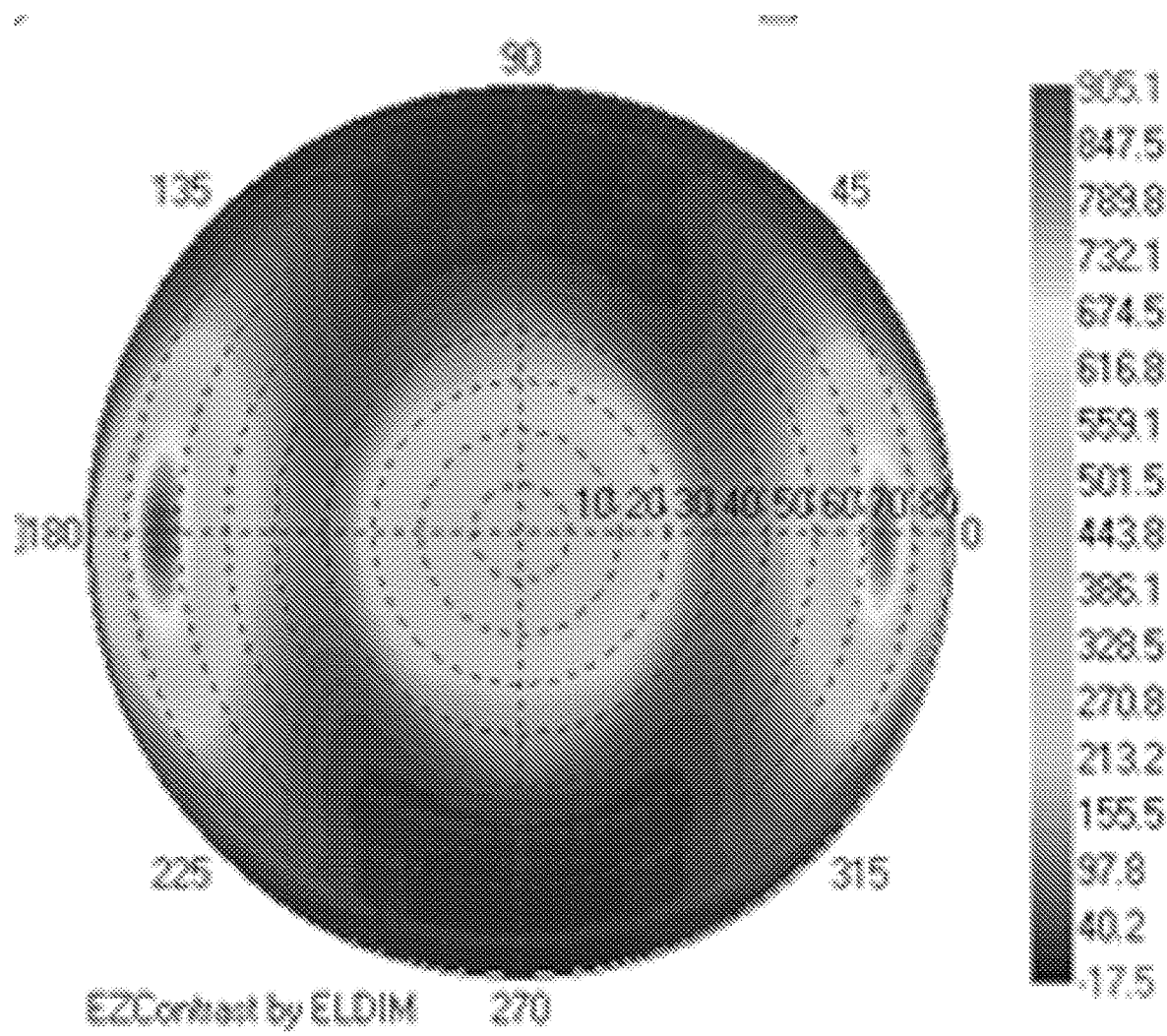
FIG. 14 is a graph showing viewing angle characteristic of the test cell produced according to Comparative Example.

The viewing angle characteristics of the test cells produced according to Example and Comparative Example were measured, and the results are shown in FIGS. 13 and 14.

FIG. 13 is a graph showing viewing angle characteristic of the test cell produced according to Example. FIG. 14 is a graph showing viewing angle characteristic of the test cell produced according to Comparative Example.

Referring to FIG. 13, it can be seen that the test cell according to Example exhibit excellent visibility in the center and in the left and right regions, and also in the upper and lower regions.

Referring to FIG. 14, it can be seen that the test cell according to Comparative Example has poor display quality generally as compared with the test cell according to Example. In particular, it can be seen that the visibility is poor in the left and right regions at angles of 30 to 50 degrees and in the upper and lower regions.

That is, it can be seen that if the difference in the refractive index between the linear patterned layer and the first overcoating layer forming the optical interface with the linear patterned layer is 0.5 or more, the luminance in the front and the visibility characteristic in the left-right regions and the upper and lower regions are drastically decreased.

While the invention has been particularly illustrated and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:
1. A liquid-crystal display device comprising:
a first polarizer which has a transmission axis extended in a first direction;
a second polarizer disposed above the first polarizer and which has a transmission axis extended in a second direction intersecting the first direction;
a liquid-crystal layer disposed between the first polarizer and the second polarizers; and
a linear patterned layer disposed between the liquid-crystal layer and the second polarizer,
wherein the linear patterned layer comprises:
a pattern of linear features and the linear features of the pattern are extended in the second direction and spaced apart from one another in the first direction; and
an overcoating layer covering the pattern of linear features to planarize one surface of the pattern of linear features.
2. The liquid-crystal display device of claim 1, further comprising:
a light source unit,
wherein the light source unit and the second polarizer are spaced apart from each other with the first polarizer interposed therebetween.

3. The liquid-crystal display device of claim 2, further comprising:
a color conversion pattern which converts a color of light incident from the light source,
wherein the linear patterned layer and the light source unit are spaced apart from each other with the color conversion pattern interposed therebetween.

4. The liquid-crystal display device of claim 3, further comprising:
a first pixel representing a first color; and
a second pixel representing a second color having a peak wavelength longer than that of the first color, and
wherein the second pixel is located on a side of the first pixel in the first direction.

5. The liquid-crystal display device of claim 4, further comprising:
a light-blocking element disposed at a boundary between the first pixel and the second pixel,
wherein the linear patterned layer and the liquid-crystal layer are spaced apart from each other with the light-blocking element interposed therebetween, and
wherein the light-blocking element at least partially overlaps with the pattern of linear features in a plan view.

6. The liquid-crystal display device of claim 2, wherein the liquid-crystal display device has a pair of longer sides and a pair of shorter sides, and
wherein the longer sides are extended in the first direction, while the shorter side are extended in the second direction.

7. The liquid-crystal display device of claim 6, wherein light provided from the light source unit and incident on the linear patterned layer is at least partially diffused in the first direction.

8. The liquid-crystal display device of claim 1, wherein a width of each of the linear features of the pattern decreases from the second polarizer toward the liquid-crystal layer.

9. The liquid-crystal display device of claim 8, wherein a ratio of a spacing distance between adjacent linear features of the pattern to a maximum width of each of the linear features ranges from about 0.5 to about 2.0.

10. The liquid-crystal display device of claim 9, wherein a ratio of a height of each of the linear features to the maximum width of each of the linear features ranges from about 0.5 to about 1.5.

11. The liquid-crystal display device of claim 9, wherein an inclination angle defined by a side surface of each of the linear features with respect to an upper surface of the linear feature is 45 degrees or more.

12. The liquid-crystal display device of claim 1, wherein a ratio of a maximum width of each of the linear features to a cell gap of the liquid-crystal layer ranges from about 0.5 to about 2.0, and wherein the liquid-crystal layer comprises vertically aligned liquid crystals in its initial orientation.

13. The liquid-crystal display device of claim 12, wherein the maximum width of each of the linear features is larger than the cell gap of the liquid-crystal layer.

14. The liquid-crystal display device of claim 1, further comprising:
a pixel electrode disposed between the first polarizer and the liquid-crystal layer; and
a common electrode disposed between the second polarizer and the liquid-crystal layer,
wherein the overcoating layer disposed between the pattern of linear features and the common electrode, and
wherein a difference between a refractive index of the pattern of linear features and a refractive index of the overcoating layer is equal to or greater than 0.15 and less than about 0.5.

15. The liquid-crystal display device of claim 1, wherein the second polarizer comprises a wire grid pattern layer comprising a pattern of wires and the wires of the pattern are extended in the first direction and spaced apart from one another in the second direction, and
wherein a spacing distance between adjacent linear features of the pattern of linear features is larger than a spacing distance between adjacent wires of the pattern of wires in the second direction.

16. The liquid-crystal display device of claim 15, further comprising:
a light source unit; and
a color conversion pattern which converts a color of light incident from the light source unit,
wherein the light source unit and the second polarizer are spaced apart from each other with the first polarizer interposed therebetween, and
wherein the second polarizer and the linear patterned layer are spaced apart from each other with the color conversion pattern interposed therebetween.

17. The liquid-crystal display device of claim 1, further comprising:
a first pixel which represents a first color; and
a second pixel which represents a second color having a peak wavelength longer than that of the first color,
wherein the pattern of linear features comprises:
a first pattern of linear features disposed in the first pixel; and
a second pattern of linear features disposed in the second pixel, and
wherein a size of the linear feature of the second pattern is greater than a size of the linear feature of the first pattern.

18. The liquid crystal display device of claim 1, further comprising:
a first pixel and a third pixel arranged in the first direction,
wherein the pattern of linear features comprises:
a first pattern of linear features located in the first pixel, each of the features comprising a first side surface and a second side surface arranged in the first direction with this order; and
a second pattern of linear features located in the third pixel, each of the features comprising a third side surface and a fourth side surface arranged in the first direction with this order, and
wherein an inclination angle of the first side surface is substantially equal to an inclination angle of the fourth side surface, and an inclination angle of the second side surface is substantially equal to an inclination angle of the third side surface.

19. The liquid-crystal display device of claim 1, further comprising:
a first pixel and a fourth pixel arranged in the first direction, the first pixel being located more to an edge of the liquid-crystal display device than the fourth pixel,
wherein the pattern of linear features comprises:
a first pattern of linear features located in the first pixel, each of the features comprising a first side surface and a second side surface arranged in the first direction in this order; and
a second pattern of linear features located in the fourth pixel, each of the features comprising a third side surface and a fourth side surface arranged in the first direction in this order, and wherein an inclination angle of the first side surface is smaller than an inclination angle of the third side surface, and an inclination angle of the second side surface is substantially larger than an inclination angle of the fourth side surface.

* * * * *